United States Patent
Kimura et al.

(10) Patent No.: US 6,610,396 B2
(45) Date of Patent: Aug. 26, 2003

(54) RESIN MOLDING PRODUCT COMPRISING ELECTROPHOTOGRAPHIC TONER AND MANUFACTURING METHOD OF SAME

(75) Inventors: Satoshi Kimura, Nabari (JP); Shoichi Itoh, Nara (JP); Hiroshi Ishii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 23 days.

(21) Appl. No.: 09/874,678

(22) Filed: Jun. 5, 2001

(65) Prior Publication Data

US 2002/0031657 A1 Mar. 14, 2002

(30) Foreign Application Priority Data

Jun. 5, 2000 (JP) .......................... 2000-167936

(51) Int. Cl.⁷ ............... B32B 5/16; B29B 7/00
(52) U.S. Cl. .......... 428/323; 428/327; 428/328; 428/329; 264/241; 264/319; 264/328.1; 264/328.18; 264/331.11
(58) Field of Search ................... 428/323, 327, 428/328, 329; 264/241, 319, 328.1, 328.14, 328.18, 331.11

(56) References Cited

U.S. PATENT DOCUMENTS

| | | | |
|---|---|---|---|
| 4,284,701 A | * | 8/1981 | Abbott et al. ............... 430/111 |
| 4,894,308 A | * | 1/1990 | Mahabadi et al. ........... 430/137 |
| 4,900,647 A | * | 2/1990 | Hikake et al. ............... 430/137 |
| 5,215,854 A | * | 6/1993 | Yamazaki et al. ........... 430/137 |
| 5,312,710 A | * | 5/1994 | Tomita et al. ............... 430/109 |
| 5,399,455 A | * | 3/1995 | Mikami et al. .............. 430/138 |
| 5,856,056 A | * | 1/1999 | Omata et al. ................ 430/137 |
| 6,040,104 A | * | 3/2000 | Nakamura et al. .......... 430/110 |
| 6,103,440 A | * | 8/2000 | Lohr .......................... 430/110 |
| 6,143,456 A | * | 11/2000 | Silence et al. ........... 430/106.6 |
| 6,187,490 B1 | * | 2/2001 | Taya et al. .................... 430/45 |
| 6,300,031 B1 | * | 10/2001 | Kato et al. ............... 430/137.2 |

FOREIGN PATENT DOCUMENTS

| | | |
|---|---|---|
| EP | 0 906 817 A1 | 4/1999 |
| JP | 02251446 A | 10/1990 |
| JP | 06-266157 | 9/1994 |
| JP | 06-305081 | 11/1994 |
| JP | 08-069126 | 3/1996 |

* cited by examiner

*Primary Examiner*—H. Thi Le
(74) *Attorney, Agent, or Firm*—Edwards & Angell, LLP; David G. Conlin; Lisa Swiszcz-Hazzard

(57) ABSTRACT

A resin molding product of the present invention is a sandwiched molding product provided with a core layer and a skin layer having at least an electrophotographic toner. Further, it is preferable that the core layer contains an additive resin, which is compatible with a binder resin that is used for the electrophotographic toner and can give an elasticity to the core layer when the additive resin and the binder resin are dissolved with each other. According to the arrangement, it is possible to utilize as a raw material a nonstandard toner, which is produced during a manufacturing process of the electrophotographic toner, but cannot be used as a commercial product, and a discard toner, which has been used in an image forming apparatus of an electrophotographic method, thereby realizing a resin molding product of a high quality at a low cost, while the resin molding product can improve its impact resistance by use of the additive resin.

24 Claims, 8 Drawing Sheets

RESIN MOLDING PRODUCT COMPRISING ELECTROPHOTOGRAPHIC TONER AND MANUFACTURING METHOD OF SAME

FIELD OF THE INVENTION

The present invention relates to a resin molding product using an electrophotographic toner and a manufacturing method of the resin molding product particularly relates to a resin molding product that uses, as a molding compound of a core layer, the electrophotographic toner which cannot be used for an apparatus such as an image forming apparatus of an electrophotographic type so as to improve the quality of the resin molding product and a manufacturing method of the resin molding product.

BACKGROUND OF THE INVENTION

According to a conventional art, in the manufacturing process of the electrophotographic toner, a fine toner is generated during the final classification step. Such a toner cannot be used as the product and does not fall within the standard particle diameter. The fine toner used to be discarded. However, a variety of suggestions have been made as to how to reclaim such a toner because of the recent concerns about the effective use of the raw material and environmental issues. According to one method of reclamation, for example, the fine toner is recycled during the manufacturing of the electrophotographic toner. As conventional examples dealing with the toner recycle, (a) a manufacturing method of an electrophotographic toner is disclosed in Japanese unexamined patent publication No.6-266157 (publication date: Sep. 22, 1994), and (b) a manufacturing method of a toner for developing the electrostatic charge is disclosed in Japanese unexamined patent publication No.8-69126 (publication date: Mar. 12, 1996). According to the manufacturing method disclosed in Japanese unexamined patent publication No.6-266157, the fine toner is made into pellet particles that can pass through a 2 mm mesh by a compression and granulating apparatus, and then is recycled in the toner manufacturing step. In the mean time, according to the manufacturing method disclosed in Japanese unexamined patent publication No. 8-69126, the fine toner is mixed, kneaded, and injected, and then is ground so as to form pellet particles. Thereafter, the pellet particles are recycled in the toner manufacturing step.

When using the image forming apparatus, the cleaning process generates a discard toner, which is a toner to be discarded. Image forming apparatus, having a mechanism for the toner recycle in which the discard toner is reclaimed, have been well know as the art.

Further, according to international unexamined patent publication No. WO97/38838 (international publication date: Oct. 23, 1997), disclosed is a method, for reclaiming a painted molding product, in which the discard toner is used. More specifically, in the method, a molding product that is constituted by a thermoplastic resin is painted by a paint made of a thermoplastic resin. The painted molding product is ground so as to obtain grounded pieces. The grounded pieces thus obtained are subjected to the molding so as to form another molding product. The molding product is then painted with the thermoplastic resin paint. Thus, the painted molding product is reclaimed. According to the reclamation method, the discard toner is added to the ground particles in a constant rate, or a constant amount of the toners to be discarded is added to the paint aspigment.

In the field of the molding technology of a plastic material, a combined structure known as the sandwiched structure is well known. The resin molding product having the sandwiched structure (hereinbelow referred to as the sandwiched molding product) is provided with a core layer as a main layer, and the core layer is coated with skin layers (outer layers).

Since the core layer is coated with the skin layers, the sandwiched molding product has the advantage that it is possible to make use of the properties of the respective materials to be selected as the respective layers. More specifically, for example, when using a material, such as a styrene-type resin, whose impact resistance is not adequate as the core layer, by coating the core layer with the skin layers that are made of a material having an excellent strength, preferably having the strength and stiffness of greater than the core layer, the core layer is strengthened and the appearance is improved.

The conventional arts of the sandwiched molding product, for example, are disclosed in the publications such as Japanese unexamined patent publication No. 2-251446 (publication date: Oct. 9, 1990) or Japanese unexamined patent publication No. 6-305081 (publication date: Nov. 1, 1994). The conventional arts are for improving the quality of the sandwiched molding product.

According to typical sandwiched molding products, the material of the core layer is different from that of the skin layer, and, as a result, the adhesive strength of each layer is not adequate. Accordingly, the integrality of the layers as the molding product is not adequate. According to the publication No. 2-251446, in order to solve this problem, a composite mainly made of poly phenylene-ether and poly-amid is used as the skin layer and a styrene-type resin is used as the core layer.

In the cooling process of the molding, the degree of shrinkage in each melting resin that becomes the molding compound of the core layer and the skin layer is sometimes different from each other. This causes the surface of the skin layer to have a hollow that is called a "hike", which is likely to damage the quality of the appearance in the molding product. According to the publication No. 6-305081, in order to solve this problem, an olefin thermoplastic elastomer or a styrene thermoplastic elastomer is used as the skin layer, and a mixture of a crystallizing polypropylene resin, and an ethylene-α-olefin copolymer or a styrene elastomer is used as the core layer, and the skin layer contains a predetermined amount of fillers.

In view of the conventional art relating to toner recycle, no effective reclamation method has been established with regard to the fine toner, as well as to the discard toner. Rather, most of the fine toner and discard toner is, permanently disposed of without any recycle. This is a problem.

As to the reclamation of the fine toner, according to the respective publications No. 6-266157 and No. 8-69126, the fine toner generated in the manufacturing process is added again in the manufacturing process of the toner. The reclamation of the fine toner is thus carried out. This causes that the quality of the toner that is the final product to deteriorate when the amount of the fine toner is too much. Accordingly, the amount of the fine toner that can be practically reclaimed is limited.

More specifically, in order to maintain the quality of the printed image to be a level of not less than a predetermined level, the rate of the fine toner to be added in the toner manufacturing process is at most around 10 percent with respect to the entire toner amount. When the fine toner is generated at more than this rate, it cannot be avoided that the fine toner is discarded. Such discarded toner is used as fuel.

In the recycle of the discard toner that has been generated in the image forming apparatus, the similar problem arises. More specifically, according to the image forming apparatus having the toner recycle mechanism, when the rate of the discard toner becomes high in the electrophotographic toner, it is most likely that the image to be formed deteriorates. Accordingly, the discard toner contributes to the recycle only at a predetermined rate. Furthermore, when the discard toner is generated at a rate of more than the predetermined rate, it is not possible to process the discard toner as fuel, thereby resulting in that the discard toner is processed as dirt.

According to the art disclosed in the international unexamined patent publication No. WO97/38838, the discard toner is reclaimed in the painted. molding product. The rate of the amount of the discard toner that is used in the painted molding product is low, so that the painted molding product is inadequately formed. This does not allow (a) large amount of discard toner to be used and (b) improvement in the quality of the molding product that is subjected to recycle with use of the discard toner. Accordingly, it is hard to say that such an art makes good use of the discard toner.

In the mean time, according to the technical field of the foregoing sandwiched molding product, it has been true that the core layer should be provided at a low cost and high quality, and the molding work should be made with more ease.

More specifically, since the core layer is coated with the skin layers, its appearance can be ignored when an opaque material is used as the skin layer. In view of this fact, it has been well known that the wastes of the resin are used as the core layer. This allows effective reclamation of the wastes and reduces the cost of the sandwiched molding product.

However, the wastes of the resin are not uniform in their shapes and their compositions, and the wastes of the resin tend to deteriorate. This causes the possible problem that the quality of the sandwiched molding product deteriorates when the wastes are used as the core layer. For example, as described above, in the sandwiched molding product, important factors are the adhesive strength between the skin layer and the core layer and the degree of shrinkage of each layer. Therefore, it is preferable that the physical property of the molding compound constituting each layer are stable. This possibly causes the dimension stability of the core layer to become lowered and the strength of the core layer to become lowered, when the wastes are practically used as the molding compound of the core layer.

According to the art disclosed in the respective publications No. 2-251446 and No. 6-305081, it is intended to improve the quality of the sandwiched molding product that is obtained by appropriately selecting the resin compound that is used as the core layer and the skin layer and adding auxiliaries (subsidiary materials) such as fillers. However, the respective arts do not effectively use the feature that the wastes can be used as the molding compound of the core layer in the manufacturing of the sandwiched molding product. Even if the wastes of the resin are actually used, it is difficult to manufacture a molding product with high quality.

SUMMARY OF THE INVENTION

In view of the foregoing problems, the present invention is made, and its object is to provide a resin molding product and its manufacturing method with a low cost and high quality. In particular, an electrophotographic toner used as a molding compound may be (a) a nonstandard toner that is generated in the manufacturing process, and cannot be used as a commercial product, and (b) a discard toner that is a resultant of having been used once in an image forming apparatus of an electrophotographic type.

The inventors of the present invention earnestly consider the foregoing problems and originally found, so as to make the present invention, that (a) in the resin molding product in which a pellet molding compound is often used, the electrophotographic toner of the fine powder can be practically used as a main raw material of the core layer and (b) a sandwiched molding product having an excellent property can be easily obtained by using the electrophotographic toner as the main material of the core layer.

More specifically, the resin molding product of the present invention is composed of a core layer that contains the electrophotographic toner constituted by at least a binder resin and a coloring agent and skin layers with which the core layer is coated.

With this arrangement, the binder resin and the coloring agent are mixed so that the electrophotographic toner has the mechanical strength for image forming processes such as a development and a cleaning. This provides the core layer with enough strength in the sandwiched structure that forms the resin molding product.

Since the electrophotographic toner has a small diameter, it is possible to improve the impact resistance of the core layer. Further, since the electrophotographic toner has a low melting point, it is possible to carry out the molding work with ease. It is possible to effectively reclaim the electrophotographic toner especially when using the electrophotographic toner for the core layer that has previously been unable to be used.

It is preferable in the resin molding product that the electrophotographic toner is a nonstandard toner that cannot be used as toner products that are manufactured from raw materials containing binder resins and coloring agents.

With this arrangement, the electrophotographic toner used as the core layer is the nonstandard fine toner that is obtained in the manufacturing process of the electrophotographic toner and has a particle diameter of less than a predetermined diameter. This allows not only use of fine toner that does not fall within the required particle diameter of the product standard and that does not fall within the required toner physical property of not burning up, but also improves the quality of the sandwiched molding product. Thus, such a fine toner is effectively made use of In the resin molding product, the electrophotographic toner is a discard toner that is a resultant of having been used once in an image forming apparatus of an electrdphotographic type.

With this arrangement, since the material of the electrophotographic toner used as the core layer is the discard toner, it is possible (a) to reclaim the discard toner rather than processing it as dirt and (b) to improve the quality of the sandwiched molding product so as to effectively make use of the discard toner.

It is preferable in the resin molding product that the electrophotographic toner further includes a carrier component.

With this arrangement, since the material of the electrophotographic toner contains a carrier component, it is possible not only to improve the strength of the core layer, but also to obtain a bulky molding product, while making good use of the carrier to be discharged during exchanging the development apparatus and other occasions.

It is preferable in the resin molding product that the carrier component is an iron-type carrier or a ferrite-type carrier.

With this arrangement, since the carrier component is an iron-type carrier or a ferrite-type carrier, it is possible that the sandwiched molding product has the shield effect.

Especially, iron-type carriers such as magnetite show a high shield effect at a direct current or a low frequency while ferrite-type carriers have a high resistance and show a high shield effect at a high frequency.

It is preferable in the resin molding product that the carrier component is contained in the electrophotographic toner within a range of 3 weight part to 10 weight part.

With this arrangement, since the carrier component is contained in the electrophotographic toner within a range of 3 weight part to 10 weight part, it is possible to ensure the handling property of the material of the core layer even in the core layer of the sandwiched molding product without any granulation. If it is not necessary to granulate the material of the core layer, it is possible to prevent damage to the resin of the core layer and it is also possible to avoid a complex manufacturing process because the granulation process can be omitted.

It is preferable in the resin molding product that the core layer further includes an additive.

With this arrangement, since the electrophotographic toner has a small particle diameter, the electrophotographic toner and the additive are mixed and kneaded so that the additive is effectively dispersed over the entire core layer. This additive improves the performance of the sandwiched molding product.

It is preferable in the resin molding product that the additive is a fire retardant.

With this arrangement, by mixing and kneading the electrophotographic toner and the fire retardant, the fire retardant is effectively dispersed over the entire core layer. This improves the fire retardant performance of the sandwiched molding product.

It is preferable in the resin molding product that the fire retardant does not contain a halogen element.

With this arrangement, since the fire retardant does not contain a halogen element, it is possible to, avoid environmental pollution due to the fire retardant, and it is also possible to recycle the sandwiched molding product thus manufactured.

It is preferable in the resin molding product that the binder resin constituting the electrophotographic toner in the core layer is a styrene-type resin.

With this arrangement, since the styrene-type resin, which has an excellent toner performance as the binder resin, is used as the material of the electrophotographic toner, it is possible to improve the injection molding workability of the core layer.

It is preferable in the resin molding product that the skin layer includes a resin of a type similar to the binder resin constituting the electrophotographic toner in the core layer. With this arrangement, since the skin layer includes a resin similar to the principal component of the electrophotographic toner, the resins are compatible and, thus, the core layer and the skin layer are molten and mixed in a boundary surface so as to form a strong laminate surface. Since the thermal expansions of similar resins are substantially equal to each other, it is possible to prevent exfoliation and thermal denaturation caused by thermal stress in the boundary surface due to differences in thermal expansions. Further, since the core layer and the skin layer are made of styrene-type resins, it is possible to improve the workability of the sandwiched molding product and to improve the quality of the sandwiched molding product thus manufactured.

It is preferable in the resin molding product that the styrene-type resin is an ABS resin or a polystyrene resin. With this arrangement, since the styrene-type resin, forming the skin layer is an ABS resin or a polystyrene resin, the core layer and the skin layer are made of a similar material. This suppresses the stress due to the linear expansion during molding and allows the recycle to be carried out with ease. In particular, the ABS resin has strength and excellent injection molding workability. Further, the ABS resin has active co-molten property so as to provide strength in the boundary surface, and improves the fire retardancy of the resin molding product thus manufactured.

It is preferable in the resin molding product that the binder resin constituting the electrophotographic toner in the core layer is a polyester resin.

With this arrangement, since the electrophotographic toner uses a polyester resin as the binder resin, it is possible to reclaim as the core layer (a) the fine toner obtained especially in the manufacturing process of an electrophotographic toner in which the electrophotographic toner is used as a color toner or a negatively charged toner and (b) the discard toner that is obtained during image forming. Further, since the core layer and the skin layer are made of polyester resins, it is possible to improve the workability of the sandwiched molding product and it is also possible to improve the quality of the sandwiched molding product.

According to the present manufacturing method, a resin molding product is formed by coating a core layer material fabricated of an electrophotographic toner that is composed of a binder resin and a coloring agent with skin layer material fabricated of a resin.

According to this method, since the binder resin and the coloring agent are mixed to form an electrophotographic toner having mechanical strength for image forming processes such as a development and a cleaning, a strong core layer of the sandwiched molding product is provided. Since the electrophotographic toner has a small particle diameter, impact resistance of the core layer is improved, thereby improving the performance of the core layer itself. Further, since the electrophotographic toner has a low melting point, it is possible to carry out the molding work with ease. It is also possible to effectively reclaim the electrophotographic toner, especially the core layer that has previously not been usable.

It is preferable in the manufacturing method of the resin molding product that a sandwiched molding method is carried out so as to coat the core layer material with the skin layer material. The sandwiched molding method comprises the sequential steps of: (a) injecting molten skin layer material from a skin layer injecting unit toward a cavity section provided in a metal mold; (b) respectively injecting molten skin layer material from the skin layer injecting unit and molten core layer material from a core layer injecting unit; and (c) injecting again, with pressure, the molten skin layer material from the skin layer injecting unit.

According to this method, the core layer and the skin layer are formed by a single processing operation, thereby improving the workability of the sandwiched molding product.

It is preferable in the manufacturing method of the resin molding product that the electrophotographic toner is a nonstandard toner that is unusable as toner products that are manufactured in a manufacturing process from raw materials containing the binder resin and the coloring agent.

With this arrangement, the electrophotographic toner used as the core layer is a nonstandard fine toner that is obtained in the manufacturing process and has a particle diameter of less than a predetermined diameter. This allows not only use of the fine toner that does not falls within the required particle diameter of the product standard and that does not fall within the required toner physical property without burning up, but also improves the quality of the sandwiched molding product thus manufactured. Thus, such a fine toner is effectively made use of.

It is preferable in the manufacturing method of the resin molding product that the electrophotographic toner is a discard toner that is a resultant of carrying out a series of image forming processes.

According to this method, since the discard toner is used as the electrophotographic toner core layer material, it is possible to reclaim the discard toner without it being processed as dirt and it is possible to improve the quality of the sandwiched molding product so as to effectively make use of the discard toner.

It is preferable in the manufacturing method of the resin molding product that the electrophotographic toner further includes a carrier component.

In this manufacturing method, since the material of the electrophotographic toner contains a carrier component, it is possible not only to improve the strength of the core layer, but also to obtain a bulky molding product.

It is preferable in the manufacturing method of the resin molding product that the electrophotographic toner used as the core layer material is first subjected to a granulating step for forming particles having a predetermined size.

In this manufacturing method, since the electrophotographic toner used as the core layer material is first formed into particles having a predetermined size, the handling property of the core layer is accordingly ensured. Especially, in the case of the fine toner, great improvement in the handling property is achieved.

It is preferable in the manufacturing method of the resin molding product that the granulating step is carried out in a continuous extrusion apparatus for melting, mixing, and kneading, which is in accordance with the procedures in which the electrophotographic toner supplied from a raw material supply port is molten by a barrel, is sent to an outlet port by a screw, is injected outside via a die head of the outlet port, is cooled down, is solidified, and is cut so as to be formed into pellets for granulation.

According to this method, granulation of the electrophotographic toner is effectively carried out by a continuous extrusion apparatus for melting, mixing, and kneading. The dispersion of additives, which provide physical properties, and the granulation step can be concurrently carried out.

It is preferable in the manufacturing method of the resin molding product that an inner diameter D of the barrel and a length L between the raw material supply port and the outlet port satisfy $L/D \geq 7$.

According to this method, it is possible to increase the supply efficiency in the granulating step.

It is preferable in the manufacturing method of the resin molding product to use a twin-screw type extrusion apparatus.

According to this method, it is possible to avoid the instability of supply due to the entrainment of air that occurs when the extrusion apparatus has a single screw.

It is preferable in the manufacturing method of the resin molding product to use a strand type die head.

According to this method, it is possible to obtain the great granulating efficiency by suppressing the fine toner generated in the final grinding of the granulating process.

It is preferable in the manufacturing method of the resin molding product that the granulating step is carried out in the continuous extrusion apparatus for melting, mixing, and kneading which is in accordance with the procedures in which the electrophotographic toner supplied from a raw material supply port is molten, is injection-molded to have a long size so as to be subsequently ground, and the ground toner is classified by a sieve (a screen mesh). According to this method, it is possible to appropriately select a mesh scale division of the particles, thereby ensuring effective granulation.

It is preferable in the manufacturing method of the resin molding product that the scale division of the sieve falls within a range of 10 mm to 15 mm.

According to this method, it is possible to obtain greater granulating efficiency by suppressing the fine toner to be generated in the final grinding of the granulating process.

Further, it was found that in the case where the electrophotographic toner is used as the main raw material of the core layer of the sandwiched molding product, the core layer loses the elasticity and becomes fragile. In the resin molding product and its manufacturing method, it is very important to avoid the above phenomenon. Accordingly, the inventors of the present invention earnestly considered the foregoing problem and found a structure and method that avoids the above phenomenon. Thus, the present invention was made.

More specifically, the resin molding product in accordance with the present invention, in order to solve the above problem, is composed of (a) a core layer that contains at least an electrophotographic toner and an additive resin and (b) skin layers with which the core layer is coated. The additive resin is compatible with a binder resin that is used in the electrophotographic toner. Further, the core layer given elasticity, while the additive resin and the binder resin are co-molten.

With this arrangement, the binder resin that is used in the electrophotographic toner has mechanical properties that makes it endurable for development and cleaning in image forming processes. Further, the binder resin softens at a relatively low temperature so as to correspond to a fixing process via heat addition. Still a further, since the material of the electrophotographic toner as waste is uniform, the core layer becomes more stable. This provides a core layer that is fully stability because the resin hardly deteriorates even when reclaiming the electrophotographic toner as the molding compound of the core layer. In addition, the molding compound of the core layer is constituted by at least an electrophotographic toner and an additive resin, thereby providing elasticity to the core layer which is short of impact resistance so as to improve the problem of fragility. Accordingly, it is possible to obtain an excellent resin molding product having a sandwiched structure and having impact resistance and elasticity.

It is preferable in the resin molding product that the electrophotographic toner that is contained in the molding compound is a styrene-type toner-whose binder resin is a styrene-type resin, and the additive resin is an aromatic vinyl-type copolymer having a rubber property. It is more preferable that the styrene-type resin is a styrene-acryl-type resin, and the aromatic vinyl-type copolymer having a rubber property is a graft copolymer of a styrene-type monomer and a rubber copolymer.

With this arrangement, since the styrene-type resin is used as the binder resin in the electrophotographic toner, and since it is used in a monochrome image forming apparatus, which is so often used, it is possible to effectively reclaim the electrophotographic toner when a styrene-type toner is used in the above molding compound.

In addition, the styrene-type resin, especially the styrene-acryl-type resin, has mechanical strength and a highly accurate dimension. Because of these advantages, it is possible to obtain a core layer having high quality. Further, the additive resin, is an aromatic vinyl-type copolymer having a rubber property, especially a graft copolymer of a styrene-type monomer and a rubber copolymer. Thus, the additive resin is fully compatible with the styrene-type resin, thereby providing elasticity to the core layer so as to further improve the quality of the core layer.

It is preferable in the resin molding product that the molding compound has a content of 50 weight part to 80 weight part electrophotographid toner.

With this arrangement, since the content of the electrophotographic toner material in the molding compound falls within the above range, it fully ensures the molding workability and ensures a fixed content of the additive resin. Thus, it is possible to obtain a strong core layer. Further, half or more than half of the core layer is electrophotographic toner that will be reclaimed. Thus, the present invention is an effective reclamation method of electrophotographic toner.

It is preferable in the resin molding product that the molding compound includes a carrier used for a two-component developer.

With this arrangement, since the molding compound includes a carrier, the strength of the core layer improves, and it is possible to obtain a bulky molding product. Further, since the core layer includes the carrier, it is possible to provide a shield effect with respect to the core layer.

It is preferable in the resin molding product that the core layer further includes a plasticizer.

With this arrangement, since the plasticizer further improves elasticity, the core layer becomes less fragile. The impact resistance also improves, accordingly.

It is preferable in the resin molding product that the skin layer includes an aromatic vinyl-type resin as a principal component.

With this arrangement, since the skin layer and the core layer include similar types of resins as their principal components, the respective layers are molten and mixed in a boundary surface so as to form a strong laminate surface. Since the thermal expansions are substantially equal to each other over the resin molding product, it is possible to prevent exfoliation and thermal denaturation caused by thermal stress in the boundary surface due to differences between the thermal expansions.

A manufacturing method of a resin molding product in accordance with the present invention, in order to solve the foregoing problem, comprises the steps of: (a) preparing a molding compound that is used as a core layer, the molding compound including an electrophotographic toner whose binder resin is a styrene-type resin and an additive resin that has a compatibility with the binder resin and gives an elasticity to the core layer while the additive resin and the binder resin are co-molten; and (b) coating the core layer with the skin layers.

According to this method, the binder resin used in the electrophotographic toner has an excellent mechanical property and the, material of the electrophotographic toner as waste is uniform. Accordingly, when using the electrophotographic toner as the molding compound of the core layer, it is possible to manufacture a resin molding product having excellent physical properties.

Since the melting point of the electrophotographic toner is set relatively low so that it is molten in a fixing process of the image forming step, the electrophotographic toner is excellent in molding workability even when it is reclaimed as a resin molding product. Further, since the electrophotographic toner has a small particle diameter, it is possible to very easily mix it to a degree such that a variety of auxiliaries that are added during molding become uniform. For this reason, a resin molding product having excellent properties is obtained by reclaiming the electrophotographic toner for the molding compound of the core layer.

It is preferable in the manufacturing method of the resin molding product that either a nonstandard toner that is obtained during the manufacturing process or a discard toner that is generated after it was used as a developer is used as the electrophotographic toner.

According to this method, it is possible in to effectively reclaim the nonstandard toner or the discard toner that were subjected to permanent disposal in the past. Furthermore, it is possible to summarize and recover the respective toners with relative ease without any impurities that affect the molding work and reduce the quality of the resin molding product. Thus, the respective toners are low cost and have excellent quality as the molding compound of the core layer. Therefore, it is possible to manufacture a sandwiched molding product having higher quality with low cost.

It is preferable in the manufacturing method of the resin molding product that the molding compound further includes auxiliaries that provide various properties to the resin molding product. The additive resin and the auxiliaries are added to the electrophotographic toner, and are stirred and mixed. According to this method, although it is no t easy in general to uniformly disperse materials such as auxiliaries to a molding compound, since the principal component of the molding compound is a fin e particle or fine toner, it is possible to easily prepare the molding compound by merely adding the additive resin and the auxiliaries to the electrophotographic toner, and stirring and mixing them. Especially, when using a particle additive resin such as a pellet, it is possible to uniformly disperse the auxiliaries to the resin material (the electrophotographic toner) merely by stirring and mixing, because the auxiliaries generally have a shape that is easy to be dispersed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, and thus, are not limitative of the present invention.

BRIEF DESCRIPTION OF THE DRAWINGS

FIG. 3(a) is an exterior view illustrating an example of a resin molding product of the embodiment of the present invention, while FIG. 3(b) is a sectional view taken on line A—A of the resin molding product shown in FIG. 3(a).

DESCRIPTION OF THE EMBODIMENTS

Figure 1:
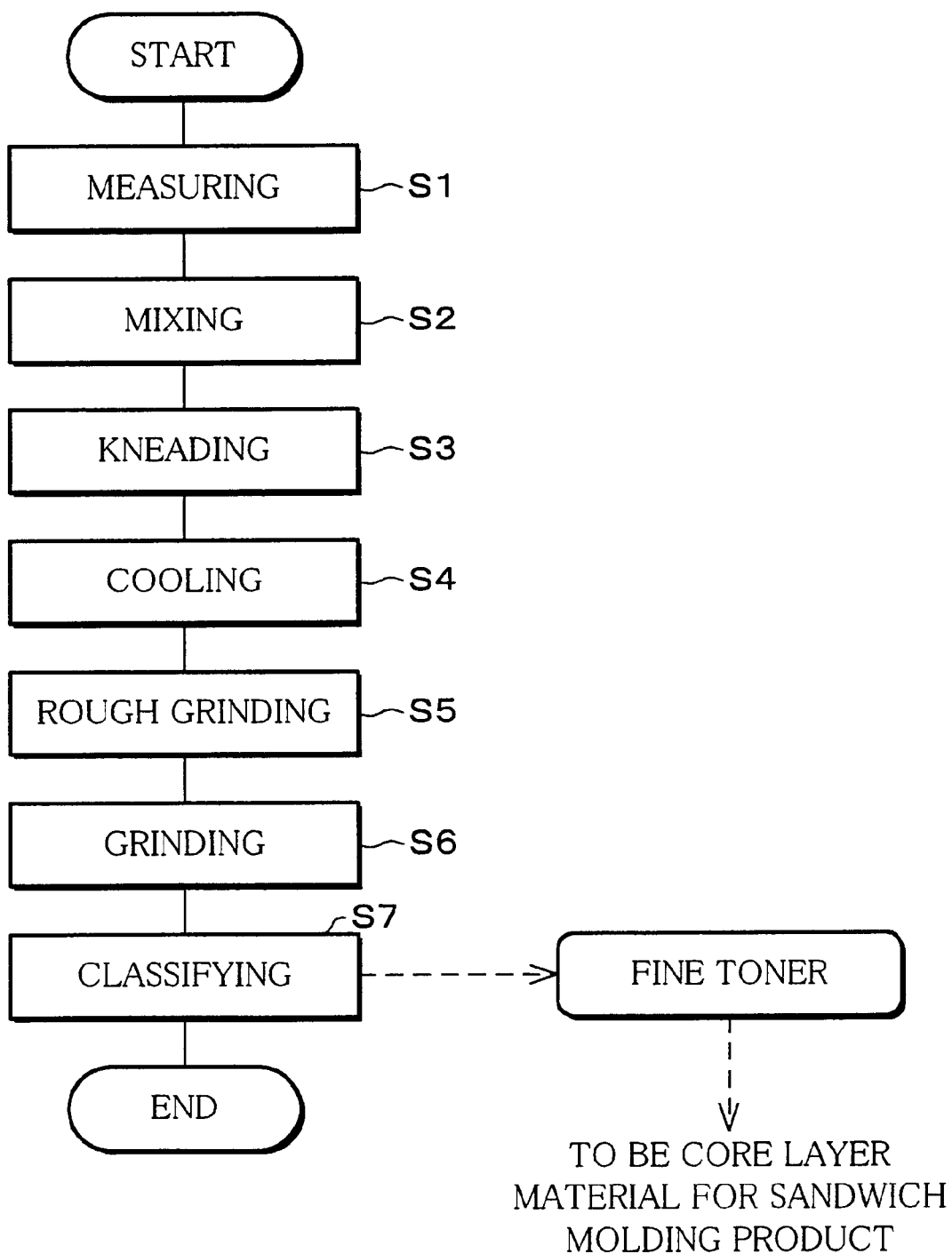
FIG. 1 is a flow diagram explaining a general manufacturing process of the core layer material for the resin molding product of an embodiment of the present invention.

Explained below is an embodiment of the present invention, based on drawings. It should be noted that, the present invention is not limited by this embodiment.

A resin molding product of the present invention has a core layer, which is molded from a molding compound which is mainly composed of an electrophotographic toner (hereinafter, it is simply denoted as a toner), and a skin layer for covering the core layer. Meanwhile, a manufacturing method of the resin molding product of the present invention is a method of molding the resin molding product by coating the molding compound (a core layer material), in which the toner is included, with a skin layer material, in which a resin is included.

It is especially preferable for the resin molding product of the present invention that the molding compound is made of an additive resin which is at least compatible (co-molten) with the electrophotographic toner and binder resin, and which makes the core layer elastic when the additive resin is dissolved together with the binder resin.

Moreover, in the manufacturing method of the resin molding product in accordance with the present invention, it is preferable that the core layer is molded with a molding compound including the additive resin and an unusable toner. As used herein, an unusable toner includes toners that are obtained during a manufacturing process, wherein the toner (hereinafter, just referred to as an nonstandard toner) cannot be a final product because it is out of standard, and includes a toner (a waste toner) that is to be discarded after being used as a developer in an image forming apparatus in an electrophotographic method. The skin layer is preferably made of a molding compound of the same type as the core layer.

In other words, the toner, which is used as the molding compound of the core layer in the present invention, is a toner that is used in an ordinary image forming apparatus of the electrophotographic method. The toner is not provided with a specific shape or composition to be used for forming the core layer. Therefore, it is also possible to use, as the toner of the present invention, a toner which is not either the nonstandard toner or the discard toner. For instance, the present invention can utilize a toner that is to be discarded as an excess stock, for example, because of an alteration of standards, even though the toner is a good enough product.

The present embodiment is based on cases where a nonstandard toner, which is discharged during the manufacturing process, and a discard toner, which is discharged during use of the image forming apparatus, are utilized as the toner for the molding compound of the core layer. Note that, in the following explanation, the term "toner materials" denotes either or both the nonstandard toner and the discard toner, which are used as the raw material of the core layer.

To begin with, the nonstandard toner, among the toner materials, is explained below in detail, based on a general composition and manufacturing process of the toner.

The toner, which is used as a developer in the image forming apparatus of the electrophotographic method, is generally in a powder form to be molten and fixed on a surface of a recording paper (a recording medium) by heating and pressuring. The main compositions, of the toner are a binder resin and a coloring agent.

In general, the toner preferably has properties such as: a light absorption property, a charge property, particle size distribution, stability during storage, flowability, and an aptitude for an image forming process. The binder resin is a compound that determines the charge property, the particle size distribution, the stability during storage, and the aptitude for the image forming process, especially for a fixing method applied therein. The coloring agent is a compound that determines the light absorption property. In addition, another main compound that determines the charge characteristics is a charge control agent (CCA) while another main compound that determines the aptitude for the fixing method is an off-set inhibitor (a mold releasing agent).

Therefore, an ordinary toner is provided with at least the binder resin and the coloring agent, and in many cases, is additionally provided with a CCA and/or an off-set inhibitor, while various additives and auxiliaries may be added to the toner in order to improve those properties.

Concrete examples of resins known to be binder resins are: styrene-type resins, polyester resins, vinyl chloride resins, rosin modified maleic acid resins, phenol resins, epoxy resins, polyethylene resins, polypropylene resins, ionomer resins, polyurethane resins, silicon resins, ketone resins, ethylene-ethylacrylate copolymer resins, xylene resins, polyvinyl butyral resins, and polycarbonate resins.

Given as the styrene-type resins are a monopolyer or a copolymer made of styrene or styrene substituent. Specifically: polystyrene, polychloro styrene, poly-α-methyl styrene, styrene-chlorostyrene copolymer, styrene-propylene copolymer, styrene-butadiene copolymer, styrene-vinyl chloride copolymer, styrene-vinyl acetate copolymer, styrene-acryl ester copolymer, styrene-methacryl ester copolymer, styrene-α-chloro methyl acrylate copolymer, styrene-acrylonitrile-acryl ester copolymer.

As to the styrene-acryl ester copolymer (the styrene-acryl-type resin), specific examples are: styrene-methyl acrylate copolymer, styrene-ethyl acrylate copolymer, styrene-octyl acrylate copolymer, styrene-phenyl acrylate. Further, as for styrene methacryl ester copolymer, specific examples are: styrene-methyl methacrylate copolymer, styrene-ethyl methacrylate copolymer, styrene-butyl methacrylate copolymer, styrene-phenyl methacrylate copolymer.

One kind or two or more kinds of those resins can be used as the binder resin. The kinds of binder resins to be used is in accordance with the type and usage of the toner to be prepared, and is not specifically limited. But in general, styrene-type resins or polyester resins are more preferably used.

The styrene-type resins are preferable because they can give excellent toner properties, especially good fixing property. To be concrete, the styrene-type resins show very excellent heat stability and fluidity during the fixing process, which lead to high fixing property of the toner. Meanwhile, the polyester resins are very excellent in transparency, fixing property and electrification property. Thus, polyester resins are excellent materials for a color toner and are preferably used.

In the present invention, where the toner is used as the molding compound of the core layer (hereinafter, just referred to as a core layer compound), the toner is preferred to have styrene-type resins as the binder resin, and more preferably, to use the styrene-acryl-type resins as the binder resin.

The styrene-type resins, especially the styrene-acryl-type resins, are used in monochrome toners as a black toner, and, thus, a large amount of these resins are discarded as non-standard toners or discard toners. On the other hand, polyethylene-type resins are often used in a color toner, and, thus, have a smaller discharge amount compared to the monochrome toner. Moreover, styrene-type resins are excellent in compatibility with an aromatic vinyl-type copolymer, which has a rubber-like property, and which is used as the additive resin. Styrene-type resins also show an excellent interlayer adhesion property with aromatic vinyl-type copolymers, which are preferably used as the skin layer. Therefore, it is very preferable in the present invention that styrene-type resins, especially the styrene-acryl-type resins, are used for the binder resin of the toner.

Specific examples of the coloring agent are well-known dyes or pigments which include carbon black, titanium oxide, zinc oxide, alumina white, calcium carbonate, ultramarine blue, iron blue, copper phtalocyanine blue, copper phtalocyanine, green, hanza yellow G, lodamin dye, chrome yellow, Quinacridone, benzigin yellow, rose bengal, triaryl methane-type dyes, anthraquinone dye, mono azo-type dye.

The coloring agents can be used solely or in combination of two or more kinds thereof. The kind of coloring to be actually used is not specifically limited to a particular kind, but is selected in accordance with a color that the toner must bear (i.e. light absorption property of the toner), or is selected in accordance with other conditions. Moreover, the quantity of the coloring agent to be added can be just enough to color the toner so that the toner can form a visible image by development. Thus, the quantity of the coloring agent is not limited to a specific quantity, but, in general, is preferred to be in a range from 1 weight part to 20 weight part, when the weight part of the binding resin is 100 weight part, while a range between 3 weight part and 15 weight part is more preferable.

The sandwiched molding product, which is discussed herein, is not affected by selecting any particular kind of coloring agents. Therefore, in the present invention, the toner, which is used for the core layer of the resin molding product, can have any color. Meanwhile, it is also possible to design the sandwiched molding products with a skin layer made of transparent materials so that the core layer can be purposely seen through the skin layer. Here, it is also possible to choose the color of the toner material to be used as the core layer material or to blend in a toner material of a certain color in the core layer material so that the sandwiched molding product can have a unique appearance, thereby improving the design thereof.

The off-set inhibitor can be any material which can offer the toner fixing property, sufficient to prevent an off-set phenomenon (a, phenomenon in which, during the fixing process, a part of the toner, which is molten, is divided and adhered on fixing means, instead of a surface of the recording paper). However, wax-type materials, such as polypropylene resins or polyethylene wax, are preferably used.

The amount of the off-set inhibitor can be just enough to inhibit the off-set phenomenon, as long as the amount results in no bad effect on the various characteristics of the toner. In general, the amount of the off-set inhibitor falls within, for example, a range between 0 weight part and 5 weight part, where the binder resin is 100 weight part.

The off-set inhibitor is added for purposes of improving cohesive force of the toner in order to prevent the off-set phenomenon. Thus, the off-set inhibitor is made of a material, which is highly compatible with the binder resin. Therefore, the off-set inhibitor may act as a plasticizer for the core layer during the preparation of the sandwiched molding product.

The CCA can be any material, which can control a frictional electrification property of the toner, and can be roughly classified into positively charged CCAs and negatively charged CCAs. Examples of the positively charged CCA are: nigrosirie-type dyes, quaternary ammonium salt-type compounds, amino silane-type compounds, triphenyl methane-type compounds, imidazole-type compounds, and polyamine resins. Meanwhile, examples of the negatively charged CCA are: azo-type dyes (chromium (Cr), cobalt (Co), aluminum (Al), and iron (Fe)); salicylate metal compound; alkyl salicylate metal compound; and calixaretie compound.

Among those CCAs, nigrosine-type dye, quaternary ammonium-type salts, and amino silane-type compounds are commonly used. In addition, the amount of the CCA can be any quantity as long as it is enough to control the frictional electrification property of the toner without adversely affecting the various characteristics of the toner. Generally, the amount of the CCA to be added falls within a range between 1 weight part and 5 weight part, where the amount of the binder resin is 100 weight part. In addition, the production of the sandwiched molding product is not affected by the type of the CCA to be used.

The manufacture of the toner, as shown in FIG. 1, involves 7 steps, namely: a measuring step (S1), a mixing step (S2), a kneading step (S3), a cooling step (S4), a rough grinding step (S5), a grinding step (S6), and a classification step (S7). Note that FIG. 1 merely shows a general manufacturing method having those 7 steps, and, thus some kinds of toners may require other steps or can omit some of the 7 steps which are unnecessary for those kinds of toners.

Moreover, the toner, which has gone through the 7 steps, is mixed with some agents, such as an exterior agent, (which is applied on a surface of the toner for giving certain characteristics to the toner), in order to produce a toner of a final product. However, steps, which are applied after the 7 steps, for example, a step of adding the exterior agent, are quite general and do not directly concern with the present invention. Thus, an explanation of the steps after the 7 steps is omitted here. Here is a detailed explanation of the toner manufacturing method. To begin with, in step (hereinafter, step is abbreviated to S) 1, which is the measuring step, ingredients, such as the binder resin, the coloring agent, the off-set inhibitor, the CCA, an interior agent (which is added and works in the inside of the toner) and auxiliaries, are measured. Next is S2 (the mixing step), wherein the measured ingredients, such as the binder resin and the coloring agents, are blended, and stirred by a mixer. In S3 (the kneading step), the mixture is molten and kneaded, for example, by a two-shaft injection molding apparatus.

Subsequently, S4 (the cooling step) is employed to cool and temporarily solidify the product material of the melting and kneading steps into a plate shape of about a 2 mm thickness. Then, S5 (the rough grinding process) is carried out so that the solidified product material of the kneading is roughly ground to approximately 1 mm thickness. The resultant ground product material is, in S6 (the grinding step), ground to particles of a 10 μm diameter by a jet mill method carried out by using a collision plate.

At last, in S7 (the classification step), the resultant particle is classified into either an in-standard particle category, which has a particle diameter falling within a predetermined range or a nonstandard particle category (a defective particle) having a particle diameter out of the predetermined range. The in-standard particles are the final product and are used as the toner, while the nonstandard particles are used as the nonstandard toner.

The nonstandard toner can be roughly divided into fine particles whose diameter is less than the predetermined range, and rough particles whose diameter exceeds the predetermined range. The fine, particles cause image quality such as the exterior agent, in the steps after S7, in order to produce the final product toner.

Furthermore, in a toner plant, where the toner is manufactured, other kinds of toners are also discarded, namely: an in-plant residue toner, which is to be discarded when the toner to be produced is switched, and a defective toner having a non-uniform property, which is produced during an initial stage of toner production in the plant. Therefore, the in-plant residue toner and the defective toner are also included in the nonstandard toner.

Listed in Table 1 are examples of the toner in the arrangement discussed above. It should be noted that, in the examples, the styrene-type resins and the polyester resins are used as the binder resin of the toners, because the resins of those types are popular as the binder resin. Note that, in the following explanation, a toner having styrene-type resins as the binder resin is referred to as "a styrene-type toner (or a styrene-type toner material)", while a toner, in which polyester resins are used as the binder resin, is denoted as "a polyester-type toner (or a polyester-type toner material)".

TABLE 1

Examples of Toners

| | Example of Styrene-type Toner | | Example of Polyester-type Toner | |
|---|---|---|---|---|
| | compound | Amount (weight part) | compound | Amount (weight part) |
| Binder Resin | Styrene-acryl resin | 100 | Polyester Resin | 82 |
| Coloring Agent | Carbon Black | 6 | 2,9-Dimethyl Quinacridone | 6 |
| CCA | Quaternary Ammonium salt | 2.5 | Quaternary Ammonium Salt | 2.5 |
| Off-Set Inhibitor | Polypropylene Resin | 1.5 | Polypropylene Resin | 1.5 |

Note:
Styrene-type Toner: A toner having the styrene-type resin as the binder resin.
Polyester-type Toner: A toner having the polyester resin as the binder resin.

deterioration of the electrophotography, such as fog, whereas the rough particles retard development resolution, because the rough particles have rough shapes. Therefore, it is inevitably necessary to separate the nonstandard toner (the toner including the fine particles and the rough particles) from the final product toner.

The rough particles can be ground again to make in-standard particles, and the fine particles can be recycled in the manufacturing process, if there is not too much. However, the nonstandard toner, especially, the fine particles, have a composition different from the toner made of the in-standard particles. Thus, only part of the nonstandard particles can be recycled into the manufacturing process. This is because the content ratio of the CCA in the fine particles is higher than that in the toner of the in-standard particles. Therefore, when the fine particles are excessively recycled into the manufacturing process the final product toner will have too high content of the CCA, thus the composition of the final product toner is changed.

In the present invention, the nonstandard toner including the fine particles is reused as the core layer of the resin molding product, which is produced by molding a resin. The resin molding process will be explained in a later section. Of course, the toner of the rough particles can be reused as the core layer.

Note that, the classified particles having a diameter within the predetermined range is further mixed with, an agent, In the following, provided is a detailed explanation on the discard toner, one of the toner materials, produced in an image forming process that is carried out using an image forming apparatus in accordance with a general electrophotography method.

Figure 2:
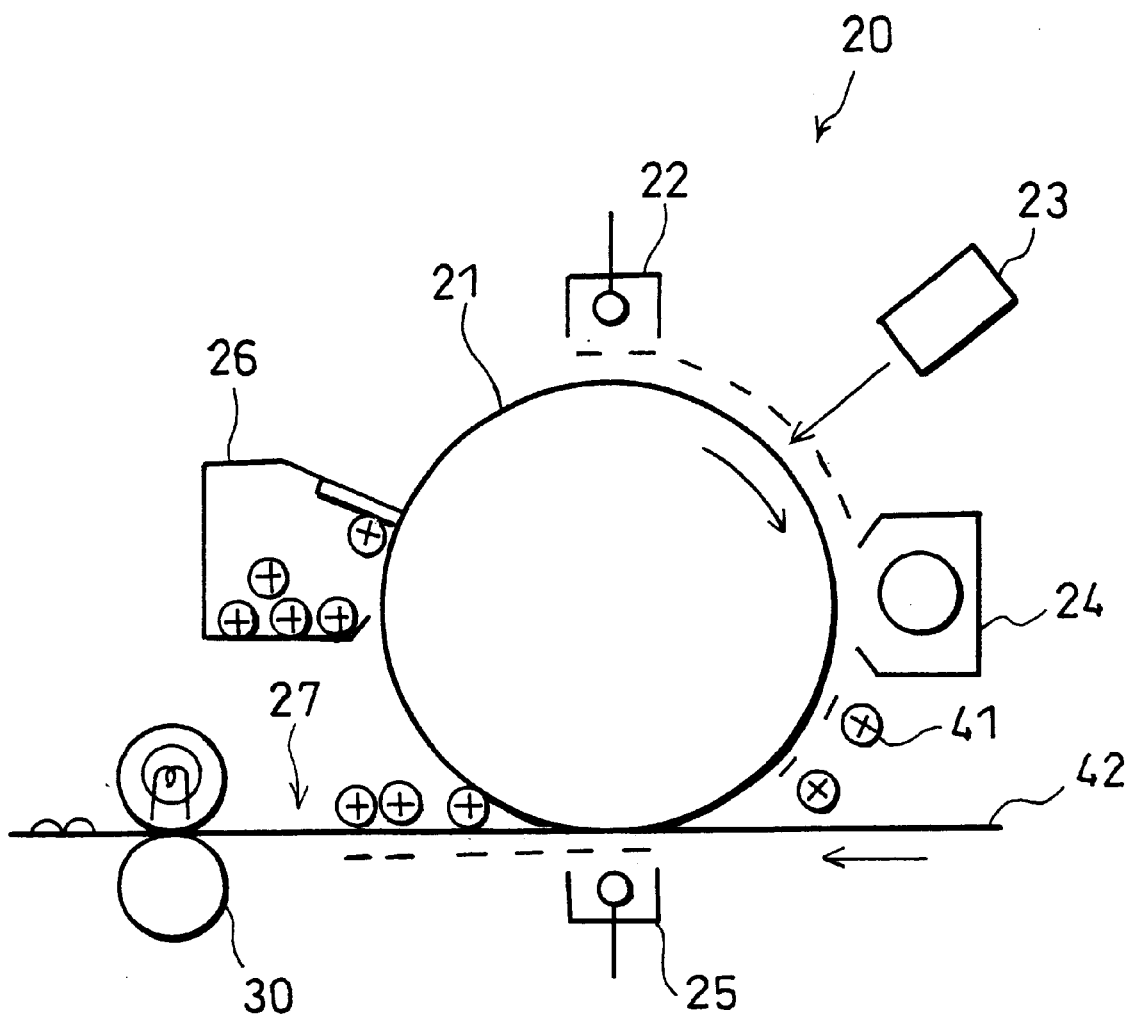
FIG. 2 is a schematic diagram showing an arrangement of an image forming section and a fixing section of a common image forming apparatus that uses a toner as a final product produced by the manufacturing method shown in FIG. 1.

The final product toner is mixed with a carrier before use in the case of a two-component system, then it is used in a development apparatus of the electrophotographic image forming apparatus. The general electrophotographic image forming apparatus is, as shown in FIG. 2, provided with an image forming section 20 and a fixing section 30. The image forming section 20 is provided with a photosensitive body 21, which is rotatable and cylinder-shaped. Around the photosensitive body 21, the image forming section 20 is equipped with an electrification apparatus 22, an exposure apparatus 23, a development apparatus 24, a transfer device 25, and a cleaning apparatus 26, in the same sequence as they are listed here. Between the photosensitive body 21 and the transfer device 25, disposed is a conveying path. 27 for recording paper 42 which is used as a recording medium. The fixing section 30 is disposed on a downstream side of the conveying path 27. Note that, other sections and their explanation in the image forming apparatus are omitted here, because they are not directly related to the image forming process and quality of the toner, which must be achieved.

Discussed below is the image forming process using the image forming apparatus. Firstly, a surface of the photosensitive body 21 is charged and unipolarized (in FIG. 2, it is negatively polarized) by the electrification apparatus 22, thus the surface becomes a charged surface. (Here, it is meant by the wording "unipolarize" that something is polarized either positively or negatively.) Next, the photosensitive body 21 is rotated so that the charged surface with the unipolarity is moved to a region of exposure in which the exposure apparatus 23 is positioned. In the region of exposure, the exposure apparatus 23 radiates the charged surface with laser light, for example. This creates a selectively electrostatic latent image on the charged surface. The rotation of the photosensitive body 21 moves the charged surface, on which the electrostatic latent image is created, to a development region, where the development apparatus 24 is located. In the development region, the development apparatus 24 supplies a toner 41 onto the electrostatic latent image so that the electrostatic latent image is developed to a toner image. In FIG. 2, the toner 41 is positively charged, and is adhered onto the electrostatic latent image having a negative polarity on the charged surface.

Subsequently, via the rotation of the photosensitive body 21, the surface on which the toner image is produced is moved to a transfer region. The transfer region receives the recording paper 42, which has been negatively polarized by the transfer device 25. The toner image, which is positively polarized, is transferred onto the recording paper 42. The recording paper 42, on which the toner image is transferred, is conveyed to the fixing section 30 so that the toner image, is fixed onto the recording paper 42, generally by being heated and pressurized.

On the other hand, a part of the toner 41 is not used for the transfer and is left on the surface of the photosensitive body 21. Thus, the photosensitive body 21 is further rotated so as to move the surface having the toner 41 left over on it. The toner 41 is removed by the cleaning apparatus 26. The cleaning apparatus 26 has no specific limitation in terms of its arrangement, but FIG. 2 shows an example of the cleaning apparatus 26, which has an arrangement to scratch off the toner, which is left over, by using a blade that is in contact with the surface of the photosensitive body 21. The removed toner 41 is discarded as the discard toner.

Here, in many cases, carrier particles (not shown in FIG. 2), apart from the toner 41, are adhered on the surface of the photosensitive body 21, which is cleaned by the cleaning apparatus 26. Thus, the discard toner is mixed with the carrier particles, to some extent. Such a discard toner mixed with the carrier particles can be used as the core layer material of the resin molding product in accordance with the present invention. Thus, it is no problem that the carrier is included in the toner material to be used as the core layer material in the present invention.

In the present embodiment, it is denoted that a toner, which is produced from raw materials including a binder resin and coloring agent, for example, the nonstandard toner, is a toner in the narrow sense. A toner in the broad sense means a toner that includes at least the carrier (the carrier compound) (it may include the exterior agent, too), for example, the discard toner. Both of the toners in the narrow sense and in the broad sense can be used as the core layer material of the present invention. Accordingly, it is also possible to use the developer of a two-component system, which is actually used for image formation and includes carrier and toner, as the core layer material. As such, the developer is a toner in the broad sense.

Meanwhile, it is possible to mix the nonstandard toner, which has no carrier, with a carrier that is discarded when the development apparatus is exchanged, so that the mixture can be used as the core layer material. Therefore, by adding the carriers to the nonstandard toner, it is possible to effectively utilize not only the nonstandard toner obtained during the manufacturing process of the toner, but also the carrier that is discarded at maintenance of the image, forming apparatus.

When the toner in the broad sense, that is the toner material of the two-component system, is prepared by mixing the toner in the narrow sense with the carrier, the core layer can have greater strength, compared to a case where only the toner in the narrow sense is used. As a result, a molding product with a massive, impression is obtained. Moreover, the core layer can have a shield effect, if the carrier is an iron-powder carrier, such as magnetite, or a ferritic-type carrier. Especially, use of the iron-powder carrier, such as magnetite, can attain a high shield effect against direct current and low frequency. On the other hand, when the ferritic-type carrier is included in the core layer, a significant shield effect against high frequency is provided, because the ferritic-type carrier has high electric resistance.

Thus, when the toner material including the carrier is used for the core layer material of the resin molding product of the present invention, the carrier functions as an auxiliary that gives the core layer and the resin molding product new characteristics.

In the present invention, the content of carrier in the toner material forming the core layer can be any amount, as long as more than 50% by weight of the toner material is toner in the narrow sense. But, it is preferred that the content of carrier in the toner material forming the core layer falls within a range between 3% by weight and 10% by weight, and is more preferred that it ranges from 4% by weight to 5% by weight.

When the carrier content is excessively high, the core layer is reinforced and given the shield effect, and handling quality of the toner material is improved. However, excessively high, carrier content is not preferable, because this reduces the content of toner in the narrow sense in the core layer, thereby making the molding of the resin more difficult. On the contrary, too small carrier content, which cannot ensure the shield effect and handling quality, causes no significant problem. Thus, the carrier content can be small. Note that, a numerical value of the carrier content is not limited to a specific value, because it varies depending on molding conditions and usage of the resin molding product having the core layer.

On the contrary, when the carrier content in the toner material falls within the range, attained are the handling quality as the core layer material, as well as the reinforcement and shield effect, thereby eliminating the need for a process to prepare particles of the toner material, which is discussed later. Thus, the manufacturing process of the resin molding product is simplified. This is because stirring the carrier leads to a stirred movement of the fine toner particles.

It should be noted that, the step of preparing particles of the toner material leads to complication of the manufacturing process of the resin molding product, and, in certain conditions, may damage the binder resin. However, the damage causes no significant impact on the binder resin, which has excellent mechanical characteristics. In addition, as discussed later, toner material without the carrier may preferably include a step of preparing the toner particle, when inclusion of the step can avoid complicating the manufacturing process.

An example of the toner material including the carrier has such a composition: the toner in the narrow sense, which has a 8 μm diameter, is between 90% by weight and 95% by weight, the iron-powder carrier or magnetite carrier having a diameter ranging from 40 μm to 60 μm is between 5% by weight and 10 % by weight.

Next, the resin molding product of the present invention is explained. The resin molding product of the present invention is a sandwiched molding product, which is provided with core layer and skin layer. The core layer is molded from the molding materials, which include the toner material and the additive resin, and is coated with the skin layer.

Figure 3:
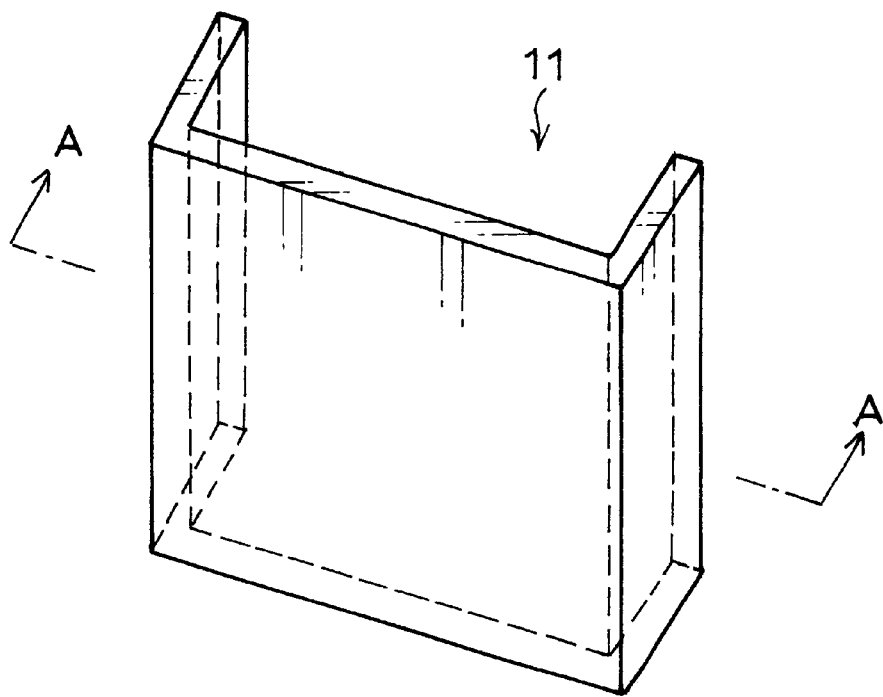
Figure 3:
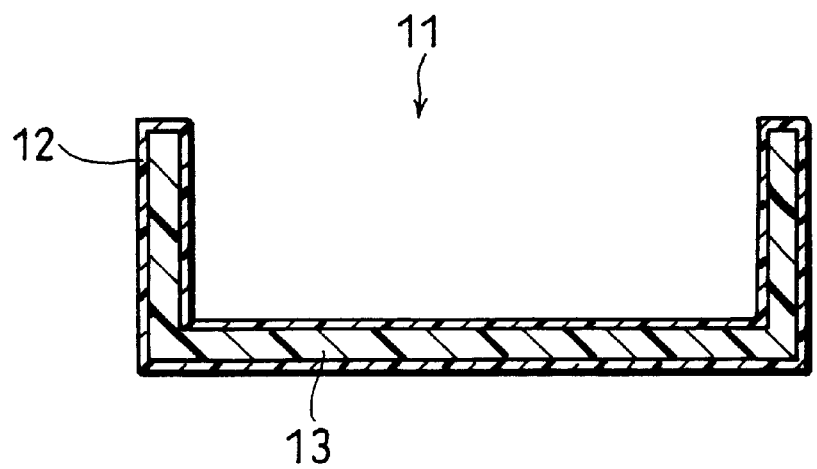

For example, suppose the resin molding product of the present invention is a board outer package 11 having a substantially "U" shape, as shown in FIG. 3(a). FIG. 3(b) is a cross-sectional view taken on A—A line of the board outer package 11 of FIG. 3(a). FIG. 3(b) illustrates a skin layer 12 formed so as to cover a core layer 13.

The present invention utilizes the toner materials, that is, the nonstandard toner and/or discard toner as core layer material for forming the core layer 12. Here, the content of the toner material with respect to the whole core layer materials falls within a range between 30% by weight and 100% by weight, where the toner material is calculated considering only the toner in the narrow sense. Here, a range between 50% by weight and 80% by weight is preferred, while a more preferable range is between 65% by weight and 75% by weight, and approximately 70% by weight is the best.

When the content ratio of the toner material is less than 30% by weight, it becomes more difficult to mold the core layer, and the molded core layer becomes less heat resistant. Furthermore, the toner materials (especially, the toner in the narrow sense) cannot be a main component of the core layer. Thus, it is not preferable to have a content of toner material less than 30% by weight. In other words, it is not preferable because it becomes meaningless to reuse the toner materials, such as the nonstandard toner and the discard toner, which cannot be or will not to be used as the developer, when the content of the toner materials is so small. On the other hand, the content of the toner materials, which can be less than 100% by weight, is especially preferred to be 80% or less because then the content of the additive resin can be increased sodas to provide elasticity, thereby retarding or avoiding the core layer from being fragile.

In this way, the toner material is used as the core layer in the present invention. The binder resin, which is the main component of the toner materials, has mechanical and heat characteristics that enable the binder resin to withstand the development and cleaning steps during the image formation process. Thus, the binder resin is quite durable. Moreover, it is easy to collect the toner materials as a waste in a lot, therefore the toner material is quite consistent in terms of its composition. Thus, the molding product can be in a very high quality when the core layer of the sandwiched molding product is prepared with toner material, while reusing the toner effectively.

Especially, styrene-type resins, which are commonly used in the monochrome toner, have very accurate sizes, thereby stabilizing the properties of the core layer. Moreover, the fragility of the core layer can be improved, because styrene-type resins are highly compatible with aromatic vinyl-type copolymers having rubber-like properties. Therefore, it is possible to provide a resin molding product having a sandwiched structure that has both of impact resistance and elasticity.

Furthermore, styrene-type resins are excellent in terms of heat stability and fluidity when they are molten. As explained later, when a toner is prepared with styrene-type resins as the binder resin, and the toner is used for a core layer of the sandwiched molding product that is produced by the injection molding, it is possible to improve efficiency of the injection molding process of the core layer.

Furthermore, as previously discussed, in addition to styrene-type resins, polyester resins may also be used as the binder resin of the toner. Polyester resins are suitable for binder resins used for color toners, and binder resins used for negatively charged toners. Therefore, fine toners and the like, which are produced during manufacturing processes of the color toner and the negatively charged toner, can be used for making the core layer of the sandwiched molding product, thereby effectively reusing the fine toner and the like.

In the present invention, it is very preferable to use a toner material made solely of the styrene-type toner, or a toner material prepared by blending the styrene-type toner and the polyester-type toner. In other words, it is very preferable that, as the core layer material, the styrene-type toner is preferable to the polyester-type toner. This is because the styrene-type resin has excellent compatibility with the aromatic vinyl-type resin that is preferably used as the additive resin and the skin layer, which will be discussed later.

Therefore, when the toner materials are considered as a whole, it is preferred that the content ratio of the styrene-type toner falls within a range between 50% by weight and 100% by weight, while the content of the polyester-type toner ranges between 0%. by weight and 50% by weight. In other words, it is not necessary to include the polyester-type toner, and when the polyester-type toner is included, it is preferred that the content of the polyester-type toner does not reach 50% by weight. This ensures the affinity of the toner material with the aromatic vinyl-type resin, which is used in the additive resin and the skin layer, by having the styrene-type toner as the main component, even when the toner material is a mixture of the styrene-type toner and the polyester-type toner. Note that, the addition of the polyester-type toner can facilitate a function of the additive resin, that is, it can function to reinforce the core layer.

In the resin molding product of the present invention, the core layer material is compatible with the binder resin. Further, the additive resin is added in a predetermined amount. The binder resin makes the binder resin elastic when the additive resin and the binder resin are dissolved with each other.

In general, the binder resin of the toner has excellent mechanical characteristics and heat characteristics by itself, so that the toner can withstand the development and the cleaning processes. Furthermore, many of the binder resins have excellent dimension stability and, on the other hand, the binder resin is quite fragile and inferior in terms of the impact resistance and tensile strength. If the core layer is solely made of the binder resin, it is quite possible that merely a soft impact can damage the core layer.

Therefore, added into the binder resin is a resin compatible with the binder resin, whereby the binder resin is made elastic so that the fragility of the binder resin is overcome. This improves the impact resistance of the core layer, as well as its tensile strength. In this way, the core layer will not become damaged merely by soft impact and the sandwiched molding product will not be of less quality. Further, the additive resin can be selected to solve such a problem that the molding product is often of bad quality due to inferior fluidity of the core layer material during the molding process.

It is preferable that a content of the additive resin with respect to the core layer material as a whole falls within a range between 20% by weight and 50% by weight. Further preferable is a range between 25% by weight and 35% by weight. It is especially preferred that the content is around 30% by weight. The fragility of the core layer cannot be improved when the content of the additive resin is less than 20% by weight, because the content is too low, which does not improve the impact resistance of the core layer. On the other hand, when the content of the additive resin exceeds 35% by weight, the content of the toner material is lowered. As discussed previously, this is not preferable because, this makes it harder to carry out the molding process of the core layer and reduces the heat resistance of the core layer, further this makes it meaningless to reclaim the toner material.

It should be noted that, in the present invention, the fragility of the core layer indicates how hard and fragile the core layer is, and how difficult it is to modify the core layer in terms of its shape (in other words, how small the elasticity of the core layer is). Further, as discussed later, the fragility is evaluated by observing how many cracks are produced in an impact test to see whether the problem of fragility is improved or not. In other words, improvement of the fragility leads to improvement of impact resistance of the whole core layer, with respect to the resin molding product.

The additive resin can be made of any resin that is compatible with the binder resin and capable of making the binder resin elastic through polymer blending. In the present invention, it is preferred to use the aromatic vinyl-type copolymer having the rubber-like property as the additive resin, because the styrene-type toner is preferably used.

The aromatic vinyl type copolymer having the rubber-like property is a graft copolymer that is obtained by copolymerization of polymers, which are rubber polymers, having elastomeric characteristics with respect to aromatic vinyl monomers.

Specifically, the polymerization is carried out by dissolving the rubber polymers in an aromatic vinyl monomer solution. The polymerization creates a graft copolymer in which a main chain of the rubber copolymer is attached with side chains of the aromatic vinyl, copolymers. The graft copolymer is highly compatible, especially with styrene-type resins, and, thus, with the styrene-type toner used as the core layer material in the present invention. Therefore, the core layer is less fragile.

The aromatic vinyl monomers are not limited to specific kinds, but specifically, the following styrene-type monomers are preferably used: styrene, α-methyl styrene, tert-butyl styrene.

The rubber copolymers are not limited to specific kinds, but the following are examples: natural rubber (NR), styrene-butadiene rubber (SBR), butadiene rubber (BR), iso-prene rubber (IR), chloroprene rubber (CR), butyl rubber (IIR), ethylene propylene rubber (EPDM, EPM), Acryl rubber (ACM, ANM), chlorinated polyethylene rubber (CSR), fluoro-rubber (FKM), silicon rubber (Q), urethane rubber (AU, EU), polysulfide rubber (T), epichlorohydrin rubber (CO, ECO), cholorosulfonated polyethylene (CSM), polynorbormene rubber and/or polymeric elastomer compounds that are prepared by curing those rubbers. In other words, the rubber polymers can be copolymers made of two or more kinds of the monomer compounds, as well as polymers prepared from a sole kind of the monomer compounds. Note that, both the polymers and the copolymers are referred to as rubber polymers.

Among the rubber polymers, SBR and BR are preferred, because of their excellent impact resistance, while EPDM (ethylene propylenediene copolymer rubber) and EPM (ethylene propylene copolymer rubber) are preferable in terms of their excellent weather resistance.

Note that, the polymerization method of the aromatic vinyl-type copolymer having the rubber property is not limited to a specific method, and, various methods have been used conventionally, which are well-known as manufacturing methods of anti-impact polystyrene (HI polystyrene).

It is preferable that the core layer of the resin molding product of the present invention is mixed with a plasticizer, as well as the respective ingredients and additive resins. The elasticity of the core layer can be improved by adding plasticizer, thereby further improving the problem of fragility of the core layer, so that impact resistance of the core layer is improved.

Any plasticizer, by which the core layer is made elastic, can be selected. Here, given are specific examples: (a) phosphoric esters (such as tributyl phosphate, tri-n-hexyl phosphate, triphenyl phosphate, and tricresyl phosphate); b) aliphatic-basic acid esters (such as butyl oleic acid, and glycerine monooleic acid ester); (c) phthalic acid esters (such as dimethyl phthalate, diethyl phthalate, dibutyl phthalate, diheptyl phthalate, di-n-octyl phthalate, di-2-ethylhexyl phthalate, diisononyl phthalate, octyldecyl, phthalate, diisodecyl phthalate, and butylbenzyl phthalate); (d) aliphatic dibasic esters (such as di-n-butyl adipate, di-n-hexyl adipate, di-2-ethylhexyl adipate, dialkyl adipate 610, di-2-ethylhexyl azelate, dibutyl sebacate, and di-2-ethylhexyl sebacate); (e) dihydric alcohol ester (such as. diethyleneglycol benzoate, and triethyleneglycol di-2-ethyl butylate); (f) oxyacid esters (such as methylacetyl ricinoleate, butylacetyl ricinoleate,; butylphthalylbutyl glycolate, and acetyltributyl citrate); (g) chlorinated paraffin; (h) chlorinated biphenyl-2-nitro biphenyl; (i) dinonyl naphthalene; (j) o-toluenesulfonethylamid; (k) p-toluenesufphonethylamid; and methyl abietic acid.

It is possible to choose the plasticizer arbitrarily in accordance with type, shape and use of the resin molding product of the present invention. Here, in general, the plasticizer can be divided into two types, namely a primary plasticizer and a secondary plasticizer, according to the compatibility of the plasticizer with respect to the resin. In many cases, a plasticizer having a large molecular weight is classified as the secondary plasticizer, and can be used to replace some of the primary plasticizer.

Therefore, in the present invention, it is possible to select only one primary plasticizer to use solely as the plasticizer, while it is also possible to pick up more than one kind of the primary plasticizer, or to use the primary and secondary plasticizer in combination (a single kind or two or more kinds can be chosen from each of the primary and secondary plasticizers). In the present invention, especially, phthalic acid esters and phosphoric acid esters, which are classified as the primary plasticizer, are preferably used, in a view of their compatibility with the styrene-type toner (that is, the styrene-type resin) that is used as the core layer.

The amount of the plasticizer to be added is not fixed and can be arbitrarily set in accordance with the type, shape and object of the resin molding product. Specifically, it is preferable that the resin molding product of the present invention is semi-rigid to rigid. Thus, it is preferable that the addition of the plasticizer falls within a range between 1 weight part and 15 weight part, where the material to be the core layer is 100 weight part. Moreover, further preferable in the present invention is a range between 2 weight part and 7 weight part, while about 5 weight part is especially preferable.

It is not preferred that the plasticizer is added in amounts equal to or greater than 15 weight part, because the core layer becomes too soft to be semi-rigid, thereby deteriorating various characteristics of the resin molding product. Furthermore, excessive plasticizer is exuded from the core layer. On the other hand, it is also not preferable the plasticizer is added in amounts less than 1 weight part, since such a small quantity of the plasticizer is not enough to improve the elasticity of the core layer. In addition, it is more preferable that the amount of the plasticizer to be added falls within a range between 2 weight part and 7 weight part, because the plasticizer can make the core layer properly elastic, that is, semi-rigid to rigid.

Here, selected as the plasticizer is a material that is generally compatible with a target resin (in this case, the binder resin of the toner material), and is capable of being dispersed among polymer molecule chains of the resin. Therefore, wax-type materials, which are added into the toner material as the off-set inhibitor, may act as the secondary plasticizer. Thus, the amount of the primary, and secondary plasticizer to be added can be reduced, since it may be considered that the core layer is mixed with a secondary plasticizer in advance. Note that, when the off-set inhibitor can function as the secondary plasticizer, a specific amount of the respective plasticizer to be added is adjusted in accordance with the composition of the core layer materials as a whole.

Furthermore, it is sufficient that the core layer has the toner material as its main composition, and the additive resin, such as the aromatic vinyl-type polymer having the rubber property, is added in amounts within the predetermined range. Thus, it is possible to add other various auxiliaries for improving the various characteristics of the resin molding product of the present invention. Various auxiliaries can be added, but some specific examples given here are reinforcing materials and additives such as a fire retardant.

In the present invention, the reinforcing materials and the additives can be blended into the core layer quite easily and uniformly, because the main composition of the core layer is the toner material in a powder form. Therefore, the auxiliaries can make better contribution when the auxiliaries are added into the toner composition in order to mold the core layer, just like in the present invention, compared to a case where the auxiliaries are blended into an ordinary resin material to mold the core layer, as in a conventional method.

Any reinforcing material can be used, as long as the reinforcing material can give the core layer better mechanical strength. For example, fiber materials of fiber reinforced plastic (FRP) can be used. Specifically, the following are examples of the reinforcing materials: glass fibers; carbon fibers; organic fibers (such as aramid fibers, polyethylene fibers, polyester fibers, and vinylon fibers); and ceramic fibers (such as boron fibers, silicon carbide fibers, alumina fibers, calcium titanate fibers).

It is possible to use any fire retardant that can give flame resistance to the resin molding product. Specific examples of such a fire retardant are: halogen-type flame retardants (such as tetrabromo-bisphenol A [TBA], 2,2-bis(4-hydroxy-3,5-dibromopheny)propane, hexabromobenzen [HBB], tris(2,3-dibromopropyl) isocyanurate [TAIC-6B], 2,2-bis(4-hydroxyethoxy-3,5-dibromophenyl) propane [TBA-EO], decabromodiphenyl oxide [DBOPO], and halogen-containing pblyphosphate); phosphorus-type flame retardants (such as ammonium phosphate, tricresyl phosphate [TEP], tris($\beta$-chloroethyl) phosphate [CLP], tris (dichloropropyl) phosphate [CRP], cresyldiphenyl phosphate [CDP], xylenyldiphenyl phosphate [XDP], alkyl acid phosphate, and nitrogen-containing phosphoric compounds); and inorganic flame retardants (such as red phosphorus, tin oxide, antimony trioxide, zirconium hydroxide, barium metaboric acid, aluminum hydroxide, and magnesium hydroxide. Especially, flame retardants having no halogen element are preferred. Without the halogen element, the fire retardant will not pollute the environment, and, further, a resin molding product using a fire retardant without the halogen element can be easily recycled.

The amount of the fire retardant to be added is not limited, but should be in a range in which flame resistance can be attained in the resin molding product, and the content of the toner material and the additive resin with respect to the core layer material as a whole are within the preferable range mentioned above.

Apart from the fire retardant, various additives can be added, as long as they can give other characteristics to the resin molding product of the present invention. Specific examples of such an additive are fillers and thickeners. Again, the amount of those additives to be added is not limited, but should be in a range in which the specific characteristics can be attained in the resin molding product, and such that the content of the toner material and the additive resin with respect to the core layer material as a whole are within the preferable range mentioned above.

In addition, as discussed previously, the carrier, which is added to the toner material, can function as the reinforcing material to improve the strength of the core layer, and as the additive to give shield effect to the resin molding product (this kind of additive is referred to as a shielding agent, hereinafter). In short, the carrier can work as one of the auxiliaries.

Here, let us sum up the materials that must be or that are preferred to be included in the core layer material: the toner material (mainly a styrene-type toner, while a polyester-type toner can be included to a certain extent), the carrier (which can be included in the toner material), the additive resin (such as aromatic vinyl-type copolymer having rubber properties), the plasticizer, the auxiliaries (such as the reinforcing material and additives such as fire retardants).

Figure 4:
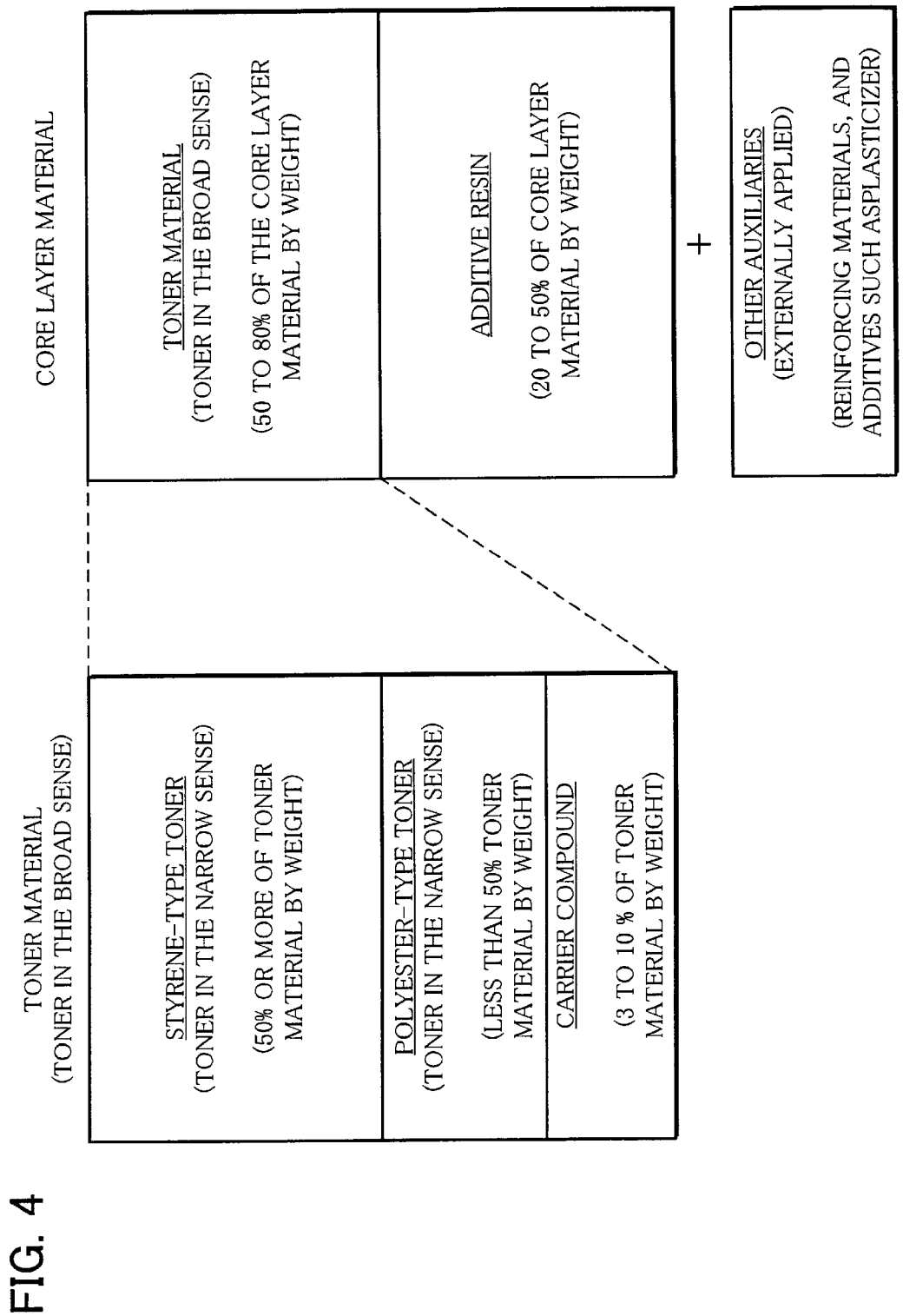
FIG. 4 is an explanatory view showing composition of the core layer material used for the resin molding product of the embodiment of the present invention.

Among those materials the toner material, as shown in FIG. 4, always shares 50% or more by weight of the core layer material as a whole, while the additive resin content is 20% or more by weight. Further, it is very preferable that 50% or more by weight of the toner material is a styrene-type toner as the toner in the narrow sense. Moreover, the carriers are considered to be included in the toner material, In other words, as shown in FIG. 4, the co re layer of the present invention has a composition in which the toner material, which is a toner in the broad sense including the carrier, and the additive resin are the main compounds of the core layer material. Thus, the other compounds, that is, the auxiliaries (such as the plasticizer and other additives, and the reinforcing materials) are considered to be applied to the core layer material.

The skin layer can be made of any molding materials (hereinafter, just referred to as a skin layer material) that can attain characteristics of the resin molding product, and is capable of covering the core layer. But, it is preferred that the skin layer material has a high affinity with the core layer. To be concrete, the skin layer is preferably made of, as a main compound, a resin of the same type as the binder resin of the toner used as the core layer.

When the main compounds of the skin layer and the core layer are the same type of resins, the core layer and the skin layer are molten and blended in their boundary due to the compatibility between the resins of the same type, thereby realizing a rigid laminated surface. Meanwhile this makes it possible to substantially equalize thermal expansion rate of the whole resin molding product. Thus, prevented is exfoliation and thermal deformation that is caused by thermal stress in the boundary between the core layer and the skin layer due to a difference between thermal expansion rates of the respective layers.

In the present invention, the core layer material should include the toner as the main compound, but has no limitation as to the type of tresin used for the binder resin of the toner. However, as explained previously, in the present embodiment, it is preferred to use a styrene-type toner. As the skin layer material, it is preferred to used aromatic vinyl-type resins, and, more preferably, styrene-type resins.

Specifically, for example, an acrylonitrile-butadiene-styrene (ABS) resin is especially preferred. The ABS resin has strength and excellent injection molding workability, while the ABS resin also has active interdiffusion. Thus, sufficient strength on the boundary surface between the core layer and the skin layer can be attained. Moreover, use of the ABS resin can improve the flame resistance of the resin molding product. Furthermore, the ABS resin, which is generally poor in transparency, can hide the color of the core layer while improving the strength.

Here, the polyester-type toner may be included in the core layer material. However, the ABS resin is highly compatible with other kinds of resin materials, so that the strength in the boundary surface between the core layer and the skin layer can be improved by use of the ABS resin, even if the content ratio of the polyester resin in the core layer material is high.

Note that, if only the polyester-type toner is used as the core layer material, the skin layer material can be made of the polyester resin as its main compound.

In addition, the skin layer may include other ingredients. In other words, the skin layer may be made of solely the aromatic vinyl-type resin, or the aromatic vinyl-type resin with various auxiliaries and a combination of the aromatic vinyl-type resin and a resin that is compatible with the aromatic vinyl-type resin. Furthermore, the amount of the aromatic vinyl-type resin to be included in the skin layer material is not limited to a certain amount, as long as the aromatic vinyl-type resin is the main compound of the skin layer material (that is, 50% or more by weight of the skin layer material is the aromatic vinyl-type resin).

Next, discussed is a manufacturing method of the resin molding product of the present invention. The manufacturing method of the sandwiched molding product of the present invention is not limited to a particular method and a combination of methods can be employed, namely: an injection molding method, a two-color molding method, a multi-color extrusion molding method, and a lamination molding method, for example. Meanwhile, a multi-layer injection molding method is especially preferred.

Figure 5:
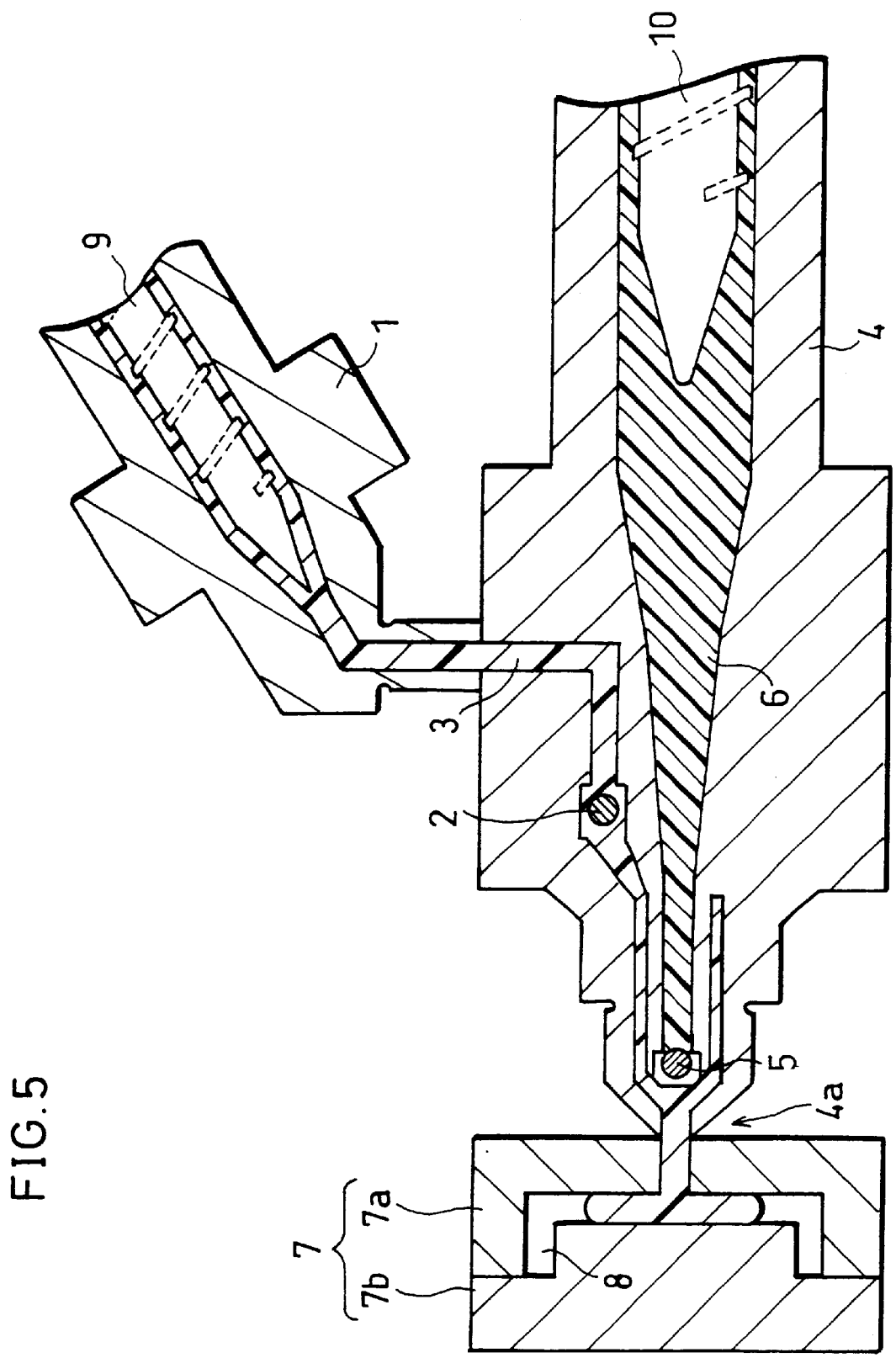
FIG. 5 is a sectional view of a multi-layer injection molding apparatus, illustrating a first step for molding a sandwiched shape by the multi-layer injection molding apparatus for producing the resin molding product shown in FIGS. 3(a) and 3(b).
Figure 6:
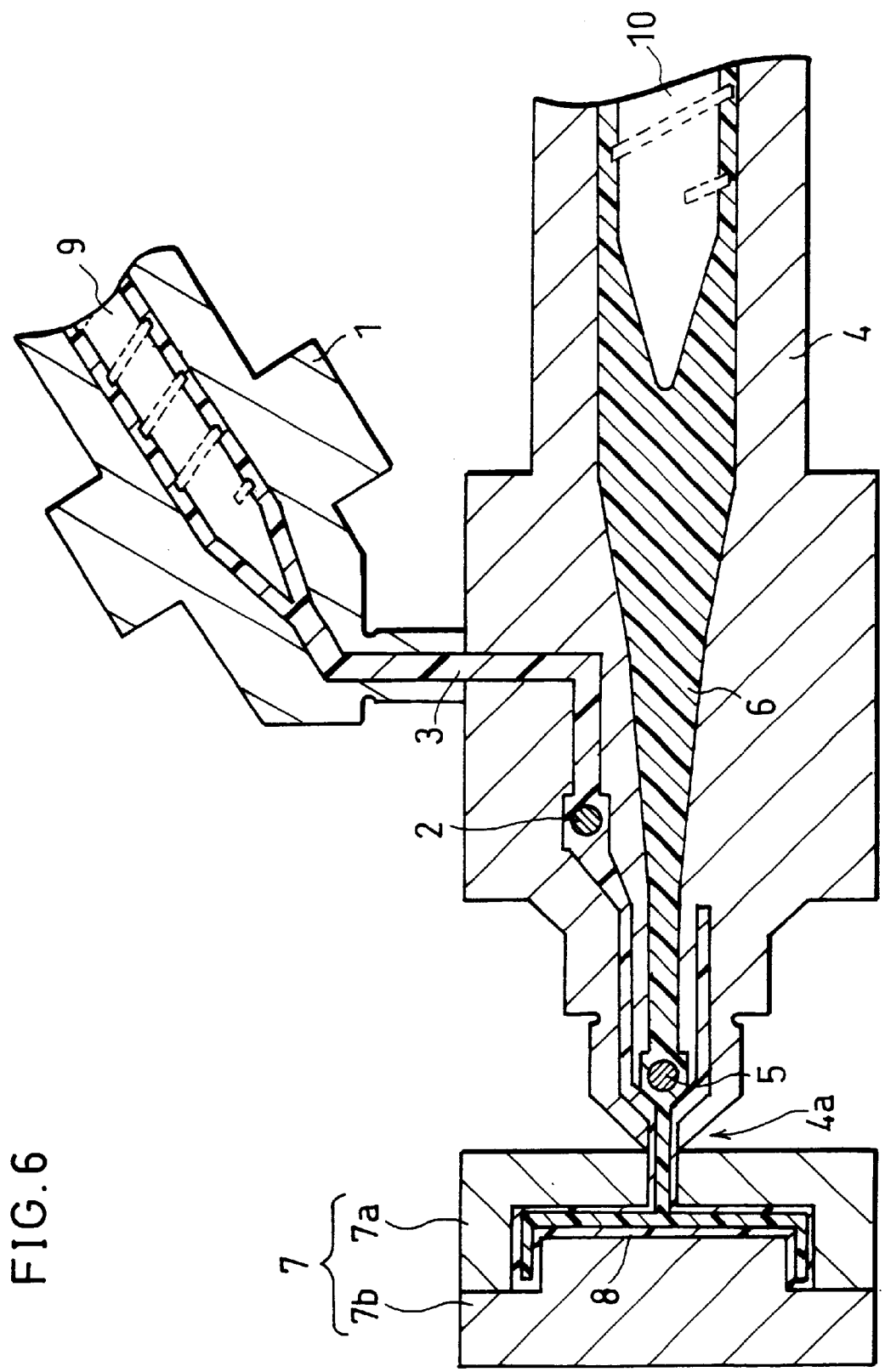
FIG. 6 is a sectional view of the multi-layer injection molding apparatus, illustrating a second step of molding the sandwiched shape, after the first step shown in FIG. 5.
Figure 7:
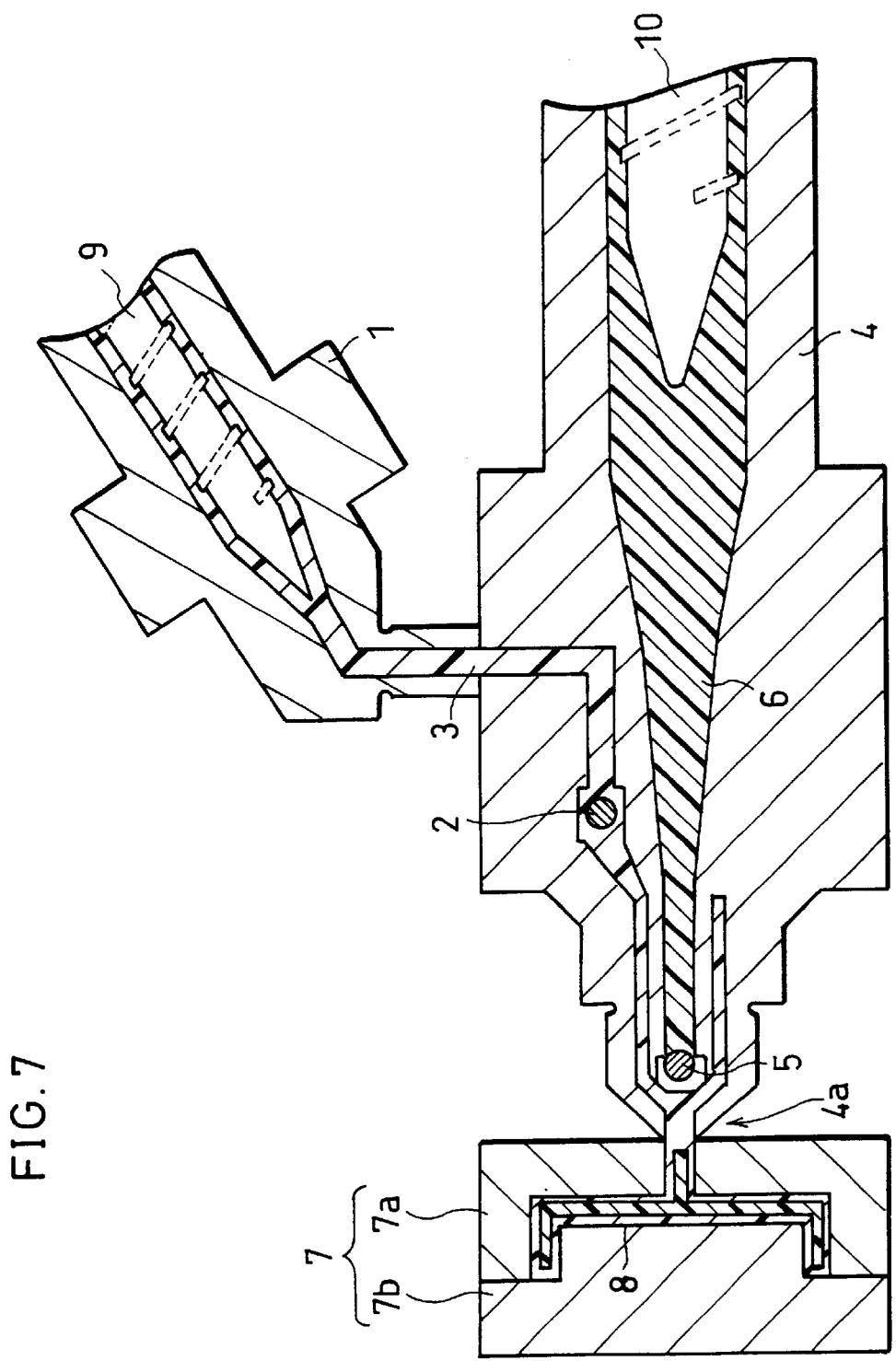
FIG. 7 is a sectional view of the multi-layer injection molding apparatus, illustrating a third step of molding the sandwiched shape, after the second step shown in FIG. 6.

The injection molding method utilizes a multi-layer injection molding apparatus or a sandwiched injection molding apparatus provided with a plurality of injection units and/or injection cylinders. In the present embodiment, explained is an example in which a multi-layer injection molding apparatus is used, as shown in FIGS. 5 through 7.

The injection molding process of the multi-layer injection molding apparatus involves three steps: a first step for injecting the skin layer, a second step for injection the core layer, and a third step for, injecting another skin layer, so as to mold the core layer material and the skin layer material by a single processing operation.

To begin with, the core layer material is prepared by blending together the toner material, the additive resin, and additionally, the auxiliaries in predetermined amounts. As the toner material, it is possible to use the nonstandard toner, such as the fine powder, and/or the discard toner. In cases where the carried is used, it is preferable that the carrier is added in advance to the toner material and stirred to be mixed well. This results in a better handling property of the toner material. This process is not necessary for cases where the carrier has been already included in the toner material, such as with the discard toner.

Moreover, if only the toner in the narrow sense, which does not include the carrier, is used as the toner material, for example, if only the fine toner is used, the handling property may not be enough. Thus, granulation is carried out for improving the handling property.

As previously discussed, the handling property of the core layer material during the resin molding process can be ensured when the core layer material is made of toner in the broad sense containing the carrier in a range between 3% by weight and 10% by weight. However, the handling property is significantly lowered in case where other kinds of toners are used, especially the fine toner having no carrier compound, which is produced during the manufacturing process of the toner.

Therefore, it is preferable that the fine toner is granulated before it is used as the core layer material, when the fine toner is the only compound in the toner material. This can significantly improve the handling property of the core layer material.

Especially, in the manufacturing method of the sandwiched molding product of the present embodiment, the core layer material (the toner material), whose main composition is the toner, and the skin layer material are respectively pressed out of a core layer injection unit and a skin layer injection unit and fitted into respective molds, so as to mold the molding product in which the core layer material is coated with the skin layer. Here, it is possible to ensure the handling property of the core layer material by granulating the toner material to a size within a predetermined range.

The granulation is not limited to a particular method. Given as a quite preferable method is use of a continuous extrusion apparatus for melting, mixing and kneading, which is conventionally well known. To be concrete, preferably employed area continuous extrusion granulation method, in which the continuous extrusion apparatus for melting, mixing, and kneading is used to granulate the toner material, and a grinding selection granulation method where a plate or a lump, which is extruded by the continuous extrusion apparatus for melting, mixing, and kneading, is ground mechanically by a grinder and classified by a sieve (a screen mesh).

Figure 8:
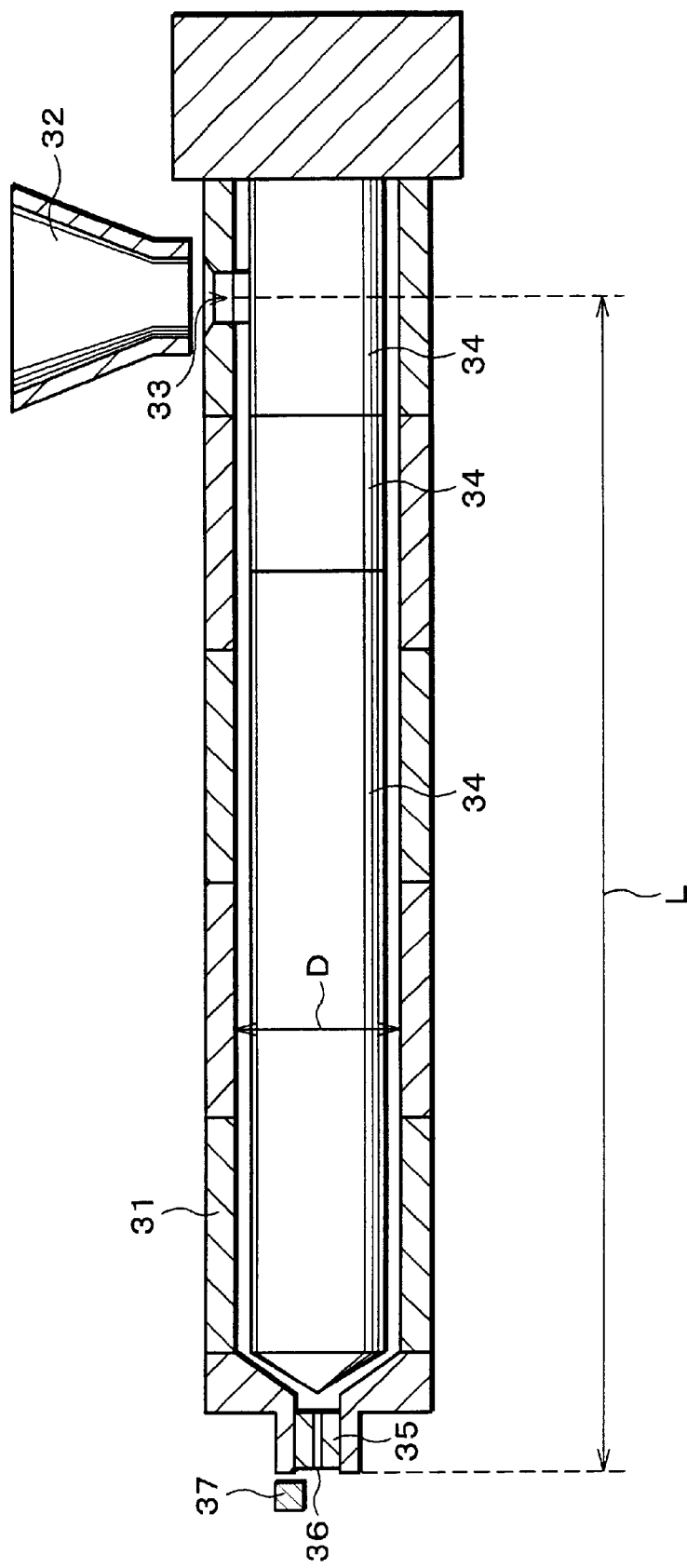
FIG. 8 is a sectional view of a schematic arrangement of a continuous extrusion apparatus for melting, mixing and kneading for granulation of an electrophotographic toner.

The granulation of the toner material is explained in detail in the following. To begin with, the continuous extrusion granulation method is explained. FIG. 8 illustrates a preferable example of the mixing and kneading apparatus for continuous injection melting, which is provided with a barrel 31, a hopper 32, a die head 35, and a cutting section (cutting means) 37.

In the continuous extrusion apparatus for melting, mixing, and kneading, the barrel 31 is divided into several parts, and is, in its inside, provided with heating means, such as an electric heater, and cooling means such as cooling pipes, which are controlled by a temperature controlling panel to adjust the temperature inside the barrel 31 in accordance with instructions. Inside the barrel 31, two screws are provided, (in other words, the apparatus is of twin-screw type) in such a manner that they are interlocked with each other and are capable of rotating at a high rotating speed of about 100 rpm to 500 rpm in the same direction.

The tonier material, such as the fine toner and the discard toner, is introduced into feeding sections 34 of the screws from the hopper 32 through a raw material supply inlet port 13. Then the toner material is preheated by the heating means provided inside the barrel 31. Subsequently, kneading sections 35 of the screws give strong shear to the toner material so that the toner material goes through auto heat generation, thereby the raw materials are dispersed by the heat. As a result, the toner material is converted into a molten form from a half-melted or solid form.

After that, the molten toner material is conveyed to an outlet port by the feeding section 34 of the screws. The molten toner is then is extruded out via a plurality of discharge openings 36 of the die head 35, which is provided at the outlet. The toner material is cooled and solidified when the toner material is extruded out of the discharge openings 36. The toner material is cut the cutting section 37 so as to be granulated as pellets.

In addition, the discharge openings 36 have, for example, an arrangement in which the discharge openings 36, having a 5 mm diameter, are aligned in a line with a pitch of 11 mm on the die head 35 of a strand style.

The continuous extrusion apparatus for melting, mixing, and kneading causes the toner material to melt and to pass through the die for granulating the toner material to a predetermined particle size. Whereby, generation of the fine toner during the granulation process can be significantly limited. As a result, granulation can be performed more efficiently.

The continuous extrusion apparatus for melting, mixing, and kneading is preferred to have a size large enough to have screws long enough to perform the feeding and kneading, and a plurality of bent openings. Thus, it is preferable that the continuous extrusion apparatus for melting, mixing, and kneading has L/D ratio=7 or more, where an inside diameter of the barrel is D mm, and a length from the raw material supply inlet port to the outlet port is L mm. In short, it is preferable that $L/D \geq 7$. With this arrangement, the granulation process can have more efficient feeding.

It is preferable that two screws are provided in the continuous extrusion apparatus for melting, mixing, and kneading (i.e. the apparatus is of twin-screw type). A single screw often causes air entrapment in the granules, thus making the production unstable, while a twin-screw can avoid the instability of the production.

Next, the grinding selection granulation method is explained. Firstly, the toner material is molten by the continuous extrusion apparatus for melting, mixing, and kneading as set out above. Then, the molten toner material is extruded into a plate shape or a lump shape on mold-releasing paper, so that the toner material is cooled to a solid state. Subsequently, the resultant solid is mechanically gained by the grinder. Then, the gained toner material is selected in accordance with a certain particle diameter by using the sieve (the screen mesh).

In the grinding selection granulation method, the size of the toner particle to be granulated is dependent on scale division of the mesh. To be concrete, the scale division is preferred to be 6 mm or more, while a more preferable scale division falls within a range between 10 mm and 15 mm. With the scale division within this range, it is possible to deal with the fine toner that is generated by over-grinding during the granulation.

In other words, in the grinding selection granulation method, the toner material is molten, injection-molded to have a long size, and ground. Subsequently, the ground toner is classified by a sieve. With a properly selected scale division of the mesh, the effect of the generation of the fine toner during the granulation step can be minimized, thereby efficiently executing the granulation process.

The preparation method of the core layer material is not limited to a particular method. The core layer material can be easily prepared with each compound sufficiently dispersed when pellets are used as the additive resin, and the respective ingredients are stirred and mixed simply by a stirring apparatus, such as a mixer, because the main composition of the toner material is in a fine powder form or a powder form, and the auxiliaries to be applied generally have shapes suitable for being mixed and stirred.

Subsequently, the multi-layer injection forming apparatus feeds the skin layer material into a skin layer injection unit 1 (refer to FIG. 5). In the same fashion, the core layer material is fed into a core layer injection unit 4 (refer to FIG. 5). The feeding method is not limited to a particular method. A hopper (not shown) can be suitable for the feeding. After the feeding, main bodies of the skin layer injection unit 1 and the core layer injection unit 4 are heated up so that the resin compositions of the skin layer material and the core layer material may be melted to form a skin layer molten resin material 3 and a core layer molten resin material 6.

Next, as shown in FIG. 5, a non-return valve 2 of the skin layer injection unit 1 is opened. Then, the skin layer molten resin material 3 is injected out of the skin layer injection unit 1 by a screw 9, so that the skin layer injection unit 1 is pressed and fitted in a cavity 8 of a metal cast 7 via a nozzle 4a of the core layer injection unit 4 (the step 1). Note that, the metal cast 7 is constituted with a metal cast 7a, which is connected to the nozzle 4a, and a metal cast 7b, which is in an opposite position to the metal cast 7a.

Subsequently, as shown in FIG. 6, after a predetermined time is passed, a non-return valve 5 of the core layer injection unit 4 is opened while the skin layer molten resin material 3 is injected. Then, the core layer molten resin material 6 is injected from the core layer injection unit 4 by a screw 10 (the second step). As a result, the skin layer molten resin material 3 is pushed by the core layer molten resin material 6, and flows inside the cavity 8.

When the cavity 8 is almost filled up with the skin layer molten resin material 3 and the core layer molten resin material 6, the non-return valve 5 is closed to stop the injection of the core layer molten resin material 6 from the core layer injection unit 4, as shown in FIG. 7. Meanwhile, the skin layer molten resin material 3 is continuously injected from the skin layer injection unit 1. Then, the skin layer molten resin material 3 and the core layer molten resin material 6, which fill the cavity 8 of the metal cast 7, are cooled to a solid state so as to obtain the sandwiched molding product having the core layer thoroughly coated with the skin layer (see FIGS. 3(*a*) and 3(*b*)).

In the manufacturing method, the preparation of the core layer material is carried out simply by stirring and mixing, and the injection molding is performed only by heating up the core layer material to a molten resin material. Such a simple process can be employed in the manufacturing method, because the toner material to be used as the core layer material is designed to have a low melting point so that the toner can be molten during the fixing process of the image forming process. In other words, the toner material is highly workable when the toner material is reclaimed as the resin molding product. Moreover, the small particle size of the toner material makes it much easier to blend in the respective auxiliaries with an even dispersion. Thus, it is easy to manufacture a sandwiched molding product of a high quality.

In the following, the present invention is discussed with a further detailed explanation, with reference to examples and comparative examples. But, the present invention is not limited to those examples.

EXAMPLE 1

A core layer material was prepared by respectively blending a toner material (see the table 1 for a styrene-type toner) having a styrene-methyl acrylate copolymer as its binder resin by 50 weight part, and a styrene monomer-SBR copolymer by 50 weight part as an aromatic vinyl-type copolymer having a rubber property (thus as an additive resin), by using a mixer. On the other hand, the skin layer material was an ABS resin on market.

While the core layer material was fed into a core layer injection unit of a multi-layer injection molding apparatus (see FIGS. 5 to 7), the ABS resin as the skin layer material were fed into a skin layer injection unit of the multi-layer injection molding apparatus. Then, the multi-layer injection molding apparatus was installed with a metal cast that is prescribed. Thereby, produced by injection molding was a test piece having a core layer of a 1 mm thickness, and a rectangular shape having a thickness of 2 mm, a width of 25 mm, and a length of 60 mm.

The test piece was evaluated in terms of improvement of fragility of the core layer. The test piece was supported in a crosswise direction by holding two spots respectively at a distance of 20 mm from its both ends. A 3 kg load was applied on the middle of the test piece for 1 second, then removed to create a condition without the load (no-loading condition) for 1 second. This was taken as one cycle (1 second with the load, and 1 second without the load). The cycle was repeated 30 times. After that, the test piece was cut substantially in half in a longitudinal direction for inspecting a cutting section of the core layer for cracks by visual observation.

Here, the evaluation of the test piece in terms of improvement of fragility of the core layer is explained as follows: x indicates that the overall cutting section of the core layer had cracks;_means that only a part of the cutting section of the core layer was cracked, thus the cracking was not so severe; and ○ shows that no crack was found on the cutting section of the core layer. The result is presented in FIG. 2.

Note that, it was considered that a composition of the core layer of the test piece was directly related to a proportion between the toner material and the aromatic vinyl-type copolymer having the rubber property in the core layer material (see table 2).

EXAMPLES 2 TO 5 AND COMPARATIVE EXAMPLES 1 AND 2

In examples 2 to 5 and comparative examples 1 and 2, the proportion of the toner material having the styrene-methyl acrylate copolymer as the binder resin (hereinafter, such a toner material is just referred to as a toner material) and the styrene monomer-SBR copolymer (hereinafter, denoted as a copolymer) was altered as shown in the following list in order to obtain different core layer materials, compared to the example 1. The rest of the procedure to make the test pieces and the testing method were identical to the example 1. In the list, the wordings "toner material" are abbreviated to TM, while the "Copolymer" is abbreviated to C. Further, in the list, the wording "Example" is shortened to Ex., while the wordings "Comparative Example" are shortened to C.Ex.

Ex.2 TM/C=60 weight part/40 weight part
Ex.3 TM/C=70 weight part/30 weight part
Ex.4 TM/C=75 weight part/25 weight part
Ex.5 TM/C=80 weight part/20 weight part
C.Ex.1 TM/C=90 weight part/10 weight part
C.Ex.2 TM/C=100 weight part/0 weight part

TABLE 2

Evaluation of the Core Layer Composition

| Ex./C.EX. | Core Layer Composition (TM/C) | Evaluation in Improvement of Fragility |
|---|---|---|
| Ex. 1 | 50/50 | ○ |
| Ex. 2 | 60/40 | ○ |
| Ex. 3 | 70/30 | ○ |
| Ex. 4 | 75/25 | ○ |
| Ex. 5 | 80/20 | — |
| C.Ex. 1 | 90/10 | X |
| C.Ex. 2 | 100/0 | X |

Abbreviation:
Ex.: Example
C.Ex.: Comparative Example TM: Toner Material
C: Copolymer Table 2 shows that the fragility problem was sufficiently improved when the core layer-material contained the additive resin in a prescribed amount, thereby realizing a sandwiched molding product having excellent impact resistance. Especially, when the additive resin was least 20% by weight or more, or preferably 30% by weight or more, the fragility problem was improved. On the other hand, in case of comparative example 2, where the core layer material was made of the toner material only, or comparative example 1 where only 10% by weight was the additive resin, no improvement was observed in terms of the fragility problem of the core layer.

It should be noted that, while only the styrene-type toner was used in the respective examples and comparative examples, but it is also possible to use a polyester-type toner as the core layer, and to use both the styrene-type toner and the polyester-type toner together, as discussed.

In this way, the present invention utilizes the electrophotographic toner as the core layer. The electrophotographic toner includes the binder resin having excellent mechanical strength and heat characteristics. Further, the electrophotographic toner, as a waste, is uniform in terms of composition. Therefore, reclamation of the electrophotographic toner as the molding material of the core layer will cause only limited deterioration in the resin. Thus the electrophotographic toner can be used as a core layer having sufficiently stable properties.

Moreover, when the electrophotographic toner is reused as the molding material of the core layer, the molding process can be easily performed, whereby the resin molding product having excellent properties can be manufactured. Furthermore, because of the small particle diameter of the electrophotographic toner, it is very easy to achieve uniform dispersion of the respective auxiliaries by blending. Therefore, it is easy to produce a sandwiched molding product of a high quality.

Furthermore, the core layer, which is originally not impact resistant, can attain elasticity, thereby improving its fragility problem, when the molding material of the core layer is composed of at least the electrophotographic toner and the additive resin. Thereby, realized is, a resin molding product having a very eminent sandwiched structure having impact resistance and elasticity, together.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A resin molding product, which is molded by a combination molding method, comprising:
    a core layer that contains an electrophotographic toner constituted by at least a binder resin and a coloring agent; and
    skin layers, including a resin, with which the core layer is coated.

2. The resin molding product as set forth in claim 1, wherein the electrophotographic toner is a nonstandard toner that is not able to be used as a product in toners that are manufactured in a manufacturing process from the raw material including the binder resin and the coloring agent.

3. The resin molding product as set forth in claim 1, wherein the electrophotographic toner is a discard toner that is a resultant of having been used once in an image forming apparatus of an electrophotographic type.

4. The resin molding product as set forth in claim 1, wherein the electrophotographic toner further includes a carrier component.

5. The resin molding product as set forth in claim 4, wherein the carrier component is an iron-type carrier or a ferrite-type carrier.

6. The resin molding product as set forth in claim 4, wherein the carrier component is included in the electrophotographic toner within a range of 3 weight part to 10 weight part.

7. The resin molding product as set forth in claim 1, wherein the core layer further includes an additive.

8. The resin molding product as set forth in claim 7, wherein the additive is a fire retardant.

9. The resin molding product as set forth in claim 8, wherein the fire retardant does not include a halogen element.

10. The resin molding product as set forth in claim 1, wherein the binder resin constituting the electrophotographic toner in the core layer is a styrene-type resin.

11. The resin molding product as set forth in claim 10, wherein the styrene-type resin is an ABS resin or a polystyrene resin.

12. The resin molding product as set forth in claim 1, wherein the binder resin constituting the electrophotographic toner in the core layer is a polyester resin.

13. The resin molding product as set forth in claim 1, wherein the skin layer includes a resin similar to the binder resin constituting the electrophotographic toner in the core layer.

14. The resin molding product as set forth in claim 1, wherein the core layer and the skin layers form a sandwiched structure.

15. The resin molding product as set forth in claim 1, wherein the core layer and the skin layers are formed by a single processing operation.

16. A resin molding product, which is molded by a combination molding method, comprising:
    a core layer that contains at least an electrophotographic toner and an additive resin; and
    skin layers with which the core layer is coated, the additive resin having a compatibility with a binder resin that is used in an electrophotographic toner, and the core layer being given an elasticity while the additive resin and the binder resin are compatible.

17. The resin molding product as set forth in claim 16, wherein the electrophotographic toner that is included in the molding compound is a styrene-type toner whose binder resin is a styrene-type resin, and the additive resin is an aromatic vinyl-type copolymer having a rubber property.

18. The resin molding product as set forth in claim 17, wherein the styrene-type resin is a styrene-acryl-type resin, and the aromatic vinyl-type copolymer having a rubber property is a graft copolymer of a styrene-type monomer and a rubber copolymer.

19. The resin molding product as set forth in claim 16, wherein the molding compound has a content of 50 weight part to 80 weight part electrophotographic toner.

20. The resin molding product as set forth in claim 16, wherein the molding compound includes a carrier used for a two-component developer.

21. The resin molding product as set forth in claim 16, wherein the core layer further includes a plasticizer.

22. The resin molding product as set forth in claim 16, wherein the skin layer includes an aromatic vinyl-type resin as a principal component.

23. The resin molding product as set forth in claim 16, wherein the core layer and the skin layers form a sandwiched structure.

24. The resin molding product as set forth in claim 16, wherein the core layer and the skin layers are formed by a single processing operation.

* * * * *